(12) United States Patent
Seki

(10) Patent No.: US 10,128,708 B2
(45) Date of Patent: Nov. 13, 2018

(54) ARMATURE AND MOTOR

(71) Applicant: ASMO CO., LTD., Kosai, Shizuoka-pref. (JP)

(72) Inventor: Akihiko Seki, Toyokawa (JP)

(73) Assignee: DENSO CORPORATION, Kariya (JP)

( * ) Notice: Subject to any disclaimer, the term of this patent is extended or adjusted under 35 U.S.C. 154(b) by 319 days.

(21) Appl. No.: 14/559,936

(22) Filed: Dec. 4, 2014

(65) Prior Publication Data
US 2015/0162794 A1 Jun. 11, 2015

(30) Foreign Application Priority Data

Dec. 10, 2013 (JP) ................................ 2013-255346

(51) Int. Cl.
*H02K 3/28* (2006.01)
*H02K 13/00* (2006.01)
*H02K 23/38* (2006.01)
*H02K 3/52* (2006.01)

(52) U.S. Cl.
CPC ............. *H02K 3/28* (2013.01); *H02K 3/527* (2013.01); *H02K 13/006* (2013.01); *H02K 23/38* (2013.01)

(58) Field of Classification Search
CPC ........ H02K 23/38; H02K 27/02; H02K 39/04; H02K 39/32; H02K 3/28; H02K 23/30
See application file for complete search history.

(56) References Cited

U.S. PATENT DOCUMENTS

| | | | | |
|---|---|---|---|---|
| 7,777,390 B2* | 8/2010 | Aoyama | .............. | H02K 13/006 310/204 |
| 7,856,703 B2* | 12/2010 | Kageyama | ............. | H02K 13/04 29/597 |
| 2004/0095036 A1* | 5/2004 | Yamamoto | ............... | H02K 3/28 310/233 |

(Continued)

FOREIGN PATENT DOCUMENTS

CN 1871759 A 11/2006
CN 102132475 A 7/2011
(Continued)

OTHER PUBLICATIONS

English language translation of the following: Office action dated Mar. 28, 2017 from the JPO in a Japanese patent application No. 2013-255346 corresponding to the instant patent application. This office action translation is submitted now in order to supplement the understanding of the cited reference which is being disclosed in the instant Information Disclosure Statement.

(Continued)

*Primary Examiner* — Joshua Benitez Rosario
*Assistant Examiner* — Leda Pham
(74) *Attorney, Agent, or Firm* — Solaris Intellectual Property Group, PLLC

(57) ABSTRACT

There is provided an armature including a shaft; a core attached to the shaft; a commutator that is attached to the shaft, and includes a plurality of commutator segments; windings that are wound onto the core, and are connected to the respective commutator segments; and a short-circuit member that connects together a pair out of the plurality of commutator segments, and is disposed further to the commutator radial direction outside than an outer peripheral portion of the commutator.

12 Claims, 17 Drawing Sheets

(56) References Cited

U.S. PATENT DOCUMENTS

2010/0308681 A1* 12/2010 Kawashima ........... H02K 23/36
                                                                            310/195

FOREIGN PATENT DOCUMENTS

| JP | 3559178 B2 | 8/2004 |
| --- | --- | --- |
| JP | 2011-041389 A | 2/2011 |
| JP | 2011-188558 A | 9/2011 |
| JP | 2013-005585 A | 1/2013 |

OTHER PUBLICATIONS

English language translation of the following: Office action dated Dec. 29, 2017 from the SIPO in a Chinese patent application No. 201410749284.4 corresponding to the instant patent application. This office action translation is submitted now in order to supplement the understanding of the cited reference(s) being disclosed in the instant Information Disclosure Statement.

* cited by examiner

ARMATURE AND MOTOR

CROSS-REFERENCE TO RELATED APPLICATION

This application claims priority under 35 USC 119 from Japanese Patent Application No. 2013-255346 filed on Dec. 10, 2013, the disclosure of which is incorporated by reference herein.

BACKGROUND

Technical Field

The present disclosure relates to an armature and a motor.

Related Art

The following is an example of an armature employed in a brushed DC motor. The armature includes a shaft, a core attached to the shaft, a commutator that is attached to the shaft and includes plural commutator segments, and windings that are wound onto the core and are connected to the respective commutator segments. Among such armatures are armatures provided with short-circuit lines that connect together any given pair out of the plural commutator segments (commutator segments that should be at the same potential as each other), i.e., the short-circuit lines serving as voltage equalizer lines, as described in Japanese Patent No. 3559178, for example.

In the armature described in Japanese Patent No. 3559178, the short-circuit line is disposed between the commutator and the core in the axial direction. There is a commensurate increase in size in the axial direction of the armature due to the short-circuit lines being disposed between the commutator and the core in the axial direction. There is an accompanying increase in the amount of material used in the armature due to the increase in size in the axial direction of the armature, increasing costs.

SUMMARY

An object of the present disclosure is to provide an armature enabling a reduction in size in the axial direction and a reduction in costs, and a motor provided with the armature.

The first aspect of the present disclosure is an armature including a shaft, a core attached to the shaft, a commutator that is attached to the shaft and includes plural commutator segments, windings that are wound onto the core and are connected to the respective commutator segments, and a short-circuit member (a voltage equalizer member) that connects together a pair out of the plural commutator segments and is disposed further to the commutator radial direction outside than an outer peripheral portion of the commutator.

According to the armature of the first aspect, the short-circuit member is employed to connect together a pair of the commutator segments, and the short-circuit member is disposed further to the commutator radial direction outside than an outer peripheral portion of the commutator. The commutator can accordingly be disposed closer to the core than when, for example, the short-circuit member is disposed between the commutator and the core in the axial direction, enabling a reduction in size of the armature in the axial direction.

According to the first aspect, due to achieving a reduction in size of the armature in the axial direction (due to disposing the commutator closer to the core), the length of the shaft and the length of the wire material used for the windings can be made shorter. A reduction in expenditure on materials is accordingly enabled, enabling a reduction in costs.

The second aspect of the present disclosure is the armature of the first aspect, wherein: the short-circuit member is assembled to the core after the windings have been wound onto the core in a state in which the core and the commutator are attached to the shaft.

According to the armature of the second aspect, the short-circuit member is assembled to the core after the windings have been wound onto the core in a state in which the core and the commutator are attached to the shaft. The short-circuit member can accordingly be suppressed from getting in the way during winding of the windings onto the core. This enables good operability to be secured during winding of the windings.

The third aspect of the present disclosure is the armature of the first aspect, wherein the short-circuit member is assembled to the core prior to winding the windings onto the core in a state in which the core and the commutator are attached to the shaft.

According to the armature of the third aspect, the short-circuit member is assembled to the core prior to winding the windings onto the core in a state in which the core and the commutator are attached to the shaft. The windings can accordingly be suppressed from getting in the way during assembly of the short-circuit member to the core. This enables good operability to be secured during assembly of the short-circuit member.

The fourth aspect of the present disclosure is the armature of any one of the first aspect to the third aspect, wherein the short-circuit member is disposed on the commutator side of the core, and the short-circuit member is assembled to the core from the commutator side in a state in which the core and the commutator are attached to the shaft.

According to the armature of the fourth aspect, the short-circuit member is disposed on the commutator side of the core, and the short-circuit member is assembled to the core from the commutator side in a state in which the core and the commutator are attached to the shaft. The assembly operation of the short-circuit member to the core can accordingly be made easier since the side on which the short-circuit member is disposed with respect to the core is the same as the side from which the short-circuit member is assembled to the core.

The fifth aspect of the present disclosure is the armature of any one of the second aspect to the fourth aspect, wherein anchor hooks are formed at the respective commutator segments, and the short-circuit member is assembled to the core prior to connecting the windings to the anchor hooks by fusing.

According to the armature of the fifth aspect, the short-circuit member is assembled to the core prior to connecting the windings to the anchor hooks by fusing. Connection of the windings to the anchor hooks by fusing, and connection of the short-circuit member to the anchor hooks by fusing, can accordingly be performed at a same time or continuously. This enables the efficiency of the fusing operation to be improved.

The sixth aspect of the present disclosure is the armature of any one of the second aspect to the fifth aspect, wherein anchor hooks are formed at the respective commutator segments, hook portions that hook onto the respective anchor hooks are formed at the short-circuit member, and the short-circuit member has a shape fixed in advance such that the hook portions hook onto the anchor hooks in a state in which the short-circuit member is assembled to the core.

According to the armature of the sixth aspect, the short-circuit member has a shape fixed in advance such that the hook portions hook onto the anchor hooks in a state in which the short-circuit member is assembled to the core. The hook portions can accordingly be hooked onto the anchor hooks accompanying assembly of the short-circuit member to the core, enabling improved operability during assembly of the short-circuit member.

The seventh aspect of the present disclosure is the armature of any one of the first aspect to the sixth aspect, wherein the commutator is in contact with, or in close proximity to, the core.

According to the armature of the seventh aspect, the commutator is in contact with, or in close proximity to, the core. An axial direction gap between the commutator and the core can accordingly be eliminated, or such a gap can be made smaller, enabling a reduction in size of the armature in the axial direction.

The eighth aspect of the present disclosure is the armature of any one of the first aspect to the seventh aspect, wherein the commutator segments form an outer peripheral portion of the commutator, anchor hooks are formed at the respective commutator segments, the short-circuit member includes a circumferential direction wiring portion provided around the circumferential direction of the commutator, and the circumferential direction wiring portion is disposed further to the commutator radial direction outside than the anchor hooks.

According to the armature of the eighth aspect, the short-circuit member includes a circumferential direction wiring portion provided around the circumferential direction of the commutator, and the circumferential direction wiring portion is disposed further to the commutator radial direction outside than the anchor hooks. This enables the circumferential direction wiring portion to be suppressed from being superimposed on the anchor hooks in the axial direction of the commutator, thereby enabling the commutator to be disposed closer to the core. This enables a reduction in size of the armature in the axial direction.

The ninth aspect of the present disclosure is the armature of the eighth aspect when dependent on the second aspect, wherein the windings each include a winding portion wound around a tooth portion formed at the core, and the circumferential direction wiring portion overlaps in the axial direction of the core with the winding portion.

According to the armature of the ninth aspect, the circumferential direction wiring portion of the short-circuit member is superimposed on the winding portion in the axial direction of the core. This enables the circumferential direction wiring portion to be suppressed from being disposed in the winding space of the winding portions (the winding space along the core radial direction), thereby enabling the desired space factor of the winding portions to be secured.

The tenth aspect of the present disclosure is the armature of the eighth aspect when dependent on the third aspect, wherein the windings each include a winding portion wound around a tooth portion formed at the core, and the circumferential direction wiring portion is disposed between in the radial direction of the core the commutator and the winding portion.

According to the armature of the tenth aspect, the circumferential direction wiring portion of the short-circuit member is disposed in the radial direction of the core between the commutator and the winding portion. Remaining space in the radial direction of the core between the commutator and the winding portions can accordingly be utilized effectively for placement of the circumferential direction wiring portion, thereby enabling a reduction in size of the armature in both the axial direction and the radial direction.

The eleventh aspect of the present disclosure is the armature of the tenth aspect, wherein the circumferential direction wiring portion is contained within a range of a projection height of the winding portion with respect to the core.

According to the armature of the eleventh aspect, the circumferential direction wiring portion of the short-circuit member is contained within a range of a projection height of the winding portion with respect to the core. The circumferential direction wiring portion of the short-circuit member can accordingly be suppressed from projecting out further in the core axial direction than the winding portions, thereby enabling a reduction in size of the commutator in the axial direction, and enabling the sliding surface area between the commutator and a brush to be secured.

The twelfth aspect of the present disclosure is the armature of either the tenth aspect or the eleventh aspect, wherein a crossing wire provided between a connection portion of each of the windings with the anchor hook and the winding portion is disposed at a separation further to the opposite side from the core than the short-circuit member.

According to the armature of the twelfth aspect, the crossing wire provided between a connection portion of each winding with the anchor hook and the winding portion is disposed at a separation further to the opposite side from the core side than the short-circuit member. The short-circuit member can accordingly be suppressed from getting in the way when laying out the crossing wire, enabling good operability to be secured during layout of the crossing wire.

The thirteenth aspect of the present disclosure is a motor including the armature of any one of the first aspect to the twelfth aspect.

The motor of the thirteenth aspect enables both a reduction in size in the axial direction and a reduction in costs, due to being provided with the armature of the first aspect to the twelfth aspect.

BRIEF DESCRIPTION OF THE DRAWINGS

Embodiments of the present disclosure will be described in detail based on the following figures, wherein.

DETAILED DESCRIPTION

First Exemplary Embodiment

Figure 1:
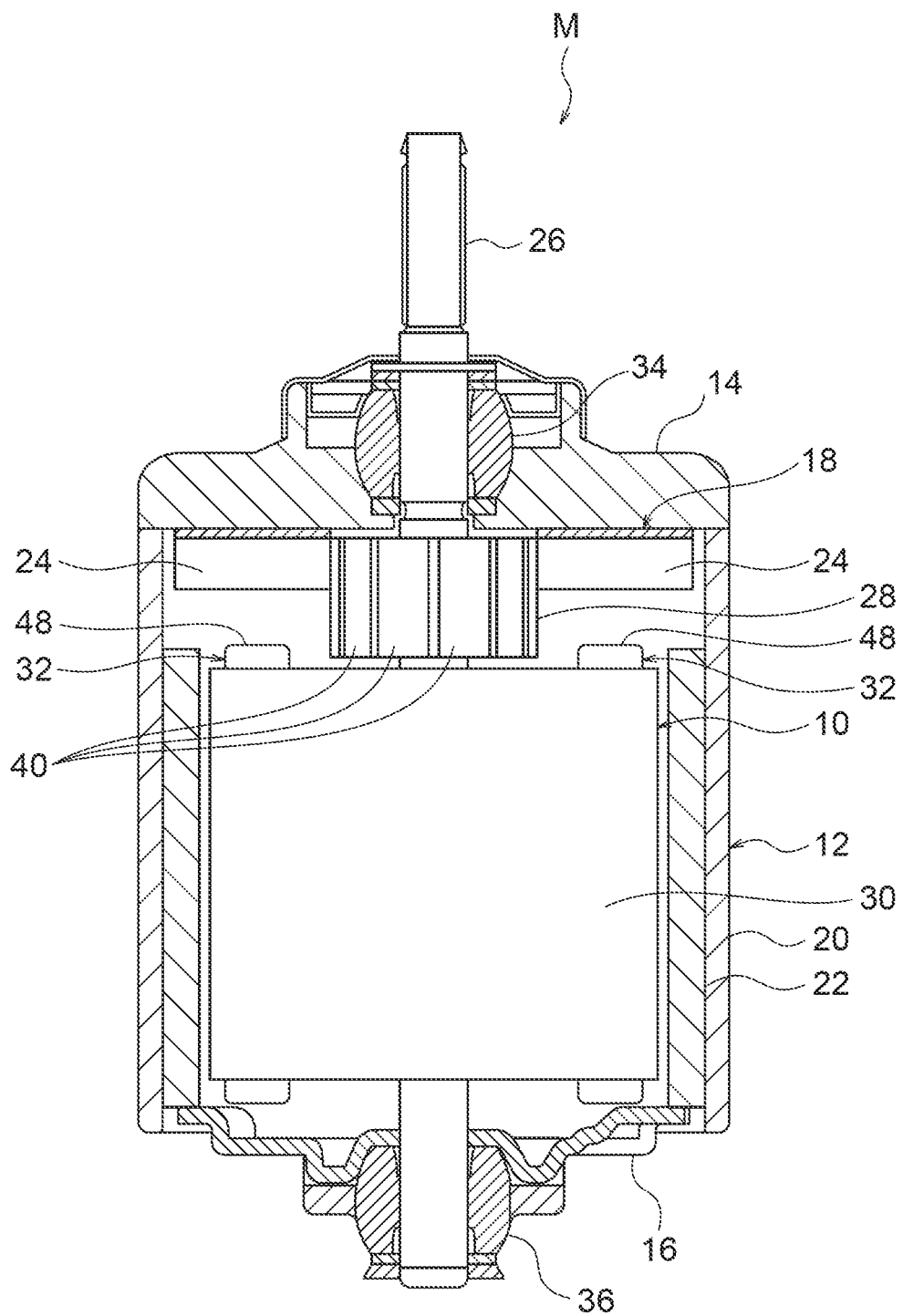
FIG. 1 is a vertical cross-section of a motor according to a first exemplary embodiment of the present disclosure.

A motor M is a brushed DC motor according to a first exemplary embodiment of the present disclosure, illustrated in FIG. 1. The motor M includes an armature 10 (rotor), described later, as well as a stator 12, a front housing 14, an end housing 16, and a brush device 18.

The stator 12 includes a yoke 20 and magnets 22. The yoke 20 is formed in a tubular shape, and the magnets 22 are fixed to an inner peripheral face of the yoke 20. The front housing 14 is fixed to one axial direction side end portion of the yoke 20, and the end housing 16 is fixed to the other axial direction side end portion of the yoke 20. The brush device 18 is fixed to the front housing 14, and includes a brush 24. The brush 24 makes contact with a commutator 28 provided to the armature 10 that is described later.

The armature 10 includes a shaft 26, the commutator 28, a core 30, and windings 32. The shaft 26 is rotatably supported by a pair of shaft bearings 34, 36 respectively provided to the front housing 14 and the end housing 16. The commutator 28 and the core 30 are attached coaxially to the shaft 26 in a row along the axial direction of the shaft 26. The windings 32 are wound onto the core 30.

Detailed explanation follows regarding the armature 10 of the first exemplary embodiment.

Figure 2:
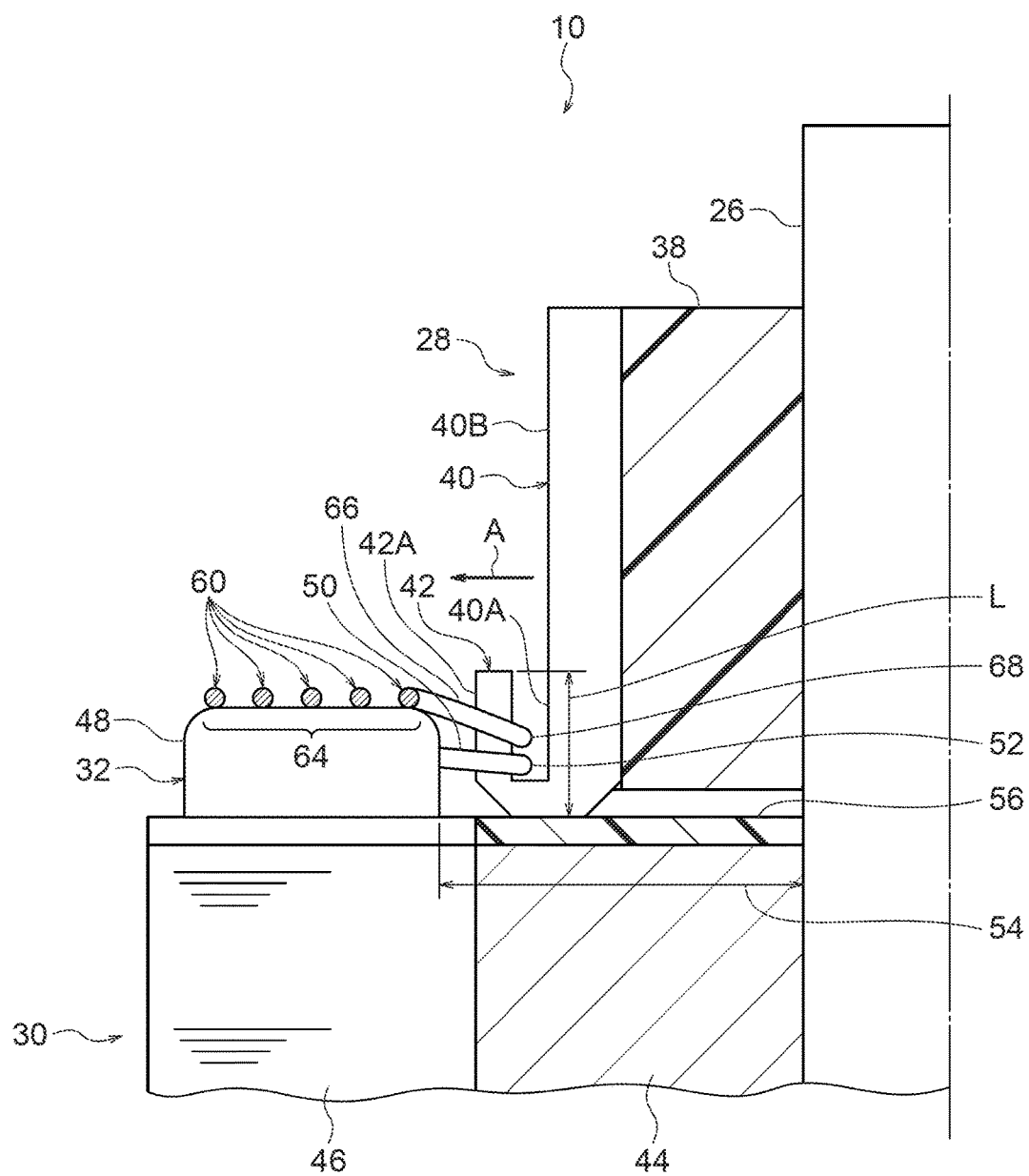
FIG. 2 is an enlarged vertical cross-section of relevant portions of an armature according to the first exemplary embodiment.

As illustrated in FIG. 2, the commutator 28 includes a resin body 38 provided at the periphery of the shaft 26, and plural commutator segments 40 provided at an outer peripheral portion of the body 38. The plural commutator segments 40 are formed in respective plate shapes extending in the axial direction of the commutator 28, and are arranged at intervals around the circumferential direction of the commutator 28.

The plural commutator segments 40 are formed from an electrically conductive material, and form an outer peripheral portion (brushed face) of the commutator 28. At core 30 side end portions of the respective commutator segments 40, a portion of each commutator segment 40 is bent around toward the opposite side to that of the core 30 to form anchor hooks 42. The anchor hooks 42 are positioned further to the radial direction outside (the arrow A direction side) of the commutator 28 than the plural commutator segments 40 disposed in a ring shape. The respective anchor hooks 42 overlap in the axial direction of the commutator 28 with a core 30 side portion 40A of each of the commutator segments 40. A portion 40B of each of the commutator segments 40 that does not overlap with the anchor hooks 42 makes sliding contact with the brush 24 (see FIG. 1).

Figure 3:
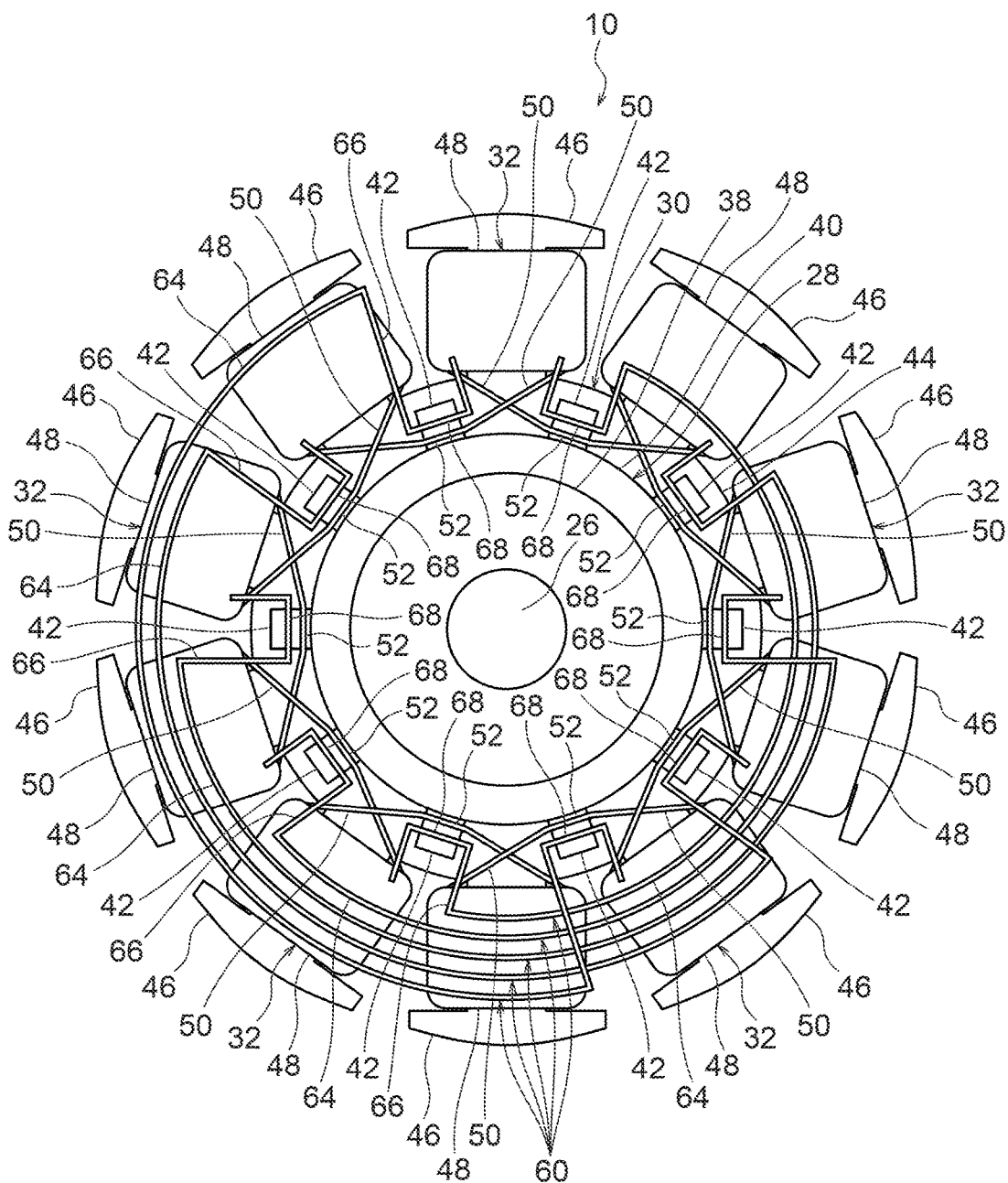
FIG. 3 is a plan view of an armature according to the first exemplary embodiment, viewed along the axial direction.

As illustrated in FIG. 3, the core 30 more specifically includes a ring shaped portion 44 formed at the periphery of the shaft 26, and plural projecting teeth 46 formed in a radial pattern at the periphery of the ring shaped portion 44. The number of the plural teeth 46 may, for example, be set at 10. In the first exemplary embodiment, there are 4 poles in the magnets 22 illustrated in FIG. 1, and so the motor M configures a 4-pole, 10-slot motor.

As illustrated in FIG. 3, the windings 32 are wound around the teeth 46 of the core 30. The portions of the windings 32 wound around the teeth 46 configure winding portions 48 of the windings 32. The winding portions 48 may be wound around the teeth 46 by concentrated winding, or may be wound between plural of the teeth 46 by distributed winding (lap winding). Crossing wires 50 lead out from the winding portions 48 toward the anchor hooks 42. End portions on the anchor hook 42 side of the crossing wires 50 configure connection portions 52 with the anchor hooks 42, and the connection portions 52 are connected to the anchor hooks 42 by, for example, fusing in a state hooked onto the anchor hooks 42 (see also FIG. 2).

As illustrated in FIG. 2, a gap 54 corresponding to the dimension of the ring shaped portion 44 is provided in the radial direction of the core 30 between the winding portions 48 and the shaft 26. The commutator 28 is disposed in the gap 54. The commutator 28 is disposed close to the core 30, as described later, in contact with the core 30 (more specifically, with an insulator 56 provided on the surface of the core 30). In the first exemplary embodiment, for an example, base end portions of the anchor hooks 42 of the commutator 28 are in contact with the core 30.

As illustrated in FIG. 2 and FIG. 3, the armature 10 according to the first exemplary embodiment is provided with plural short-circuit lines 60 as an example of a short-circuit member of the present disclosure. The plural short-circuit lines 60 and the windings 32 described above are preferably configured from the same wire material. In such cases, the wire material employed for the windings 32 and the plural short-circuit lines 60 is preferably copper or aluminum, for example.

Figure 4:
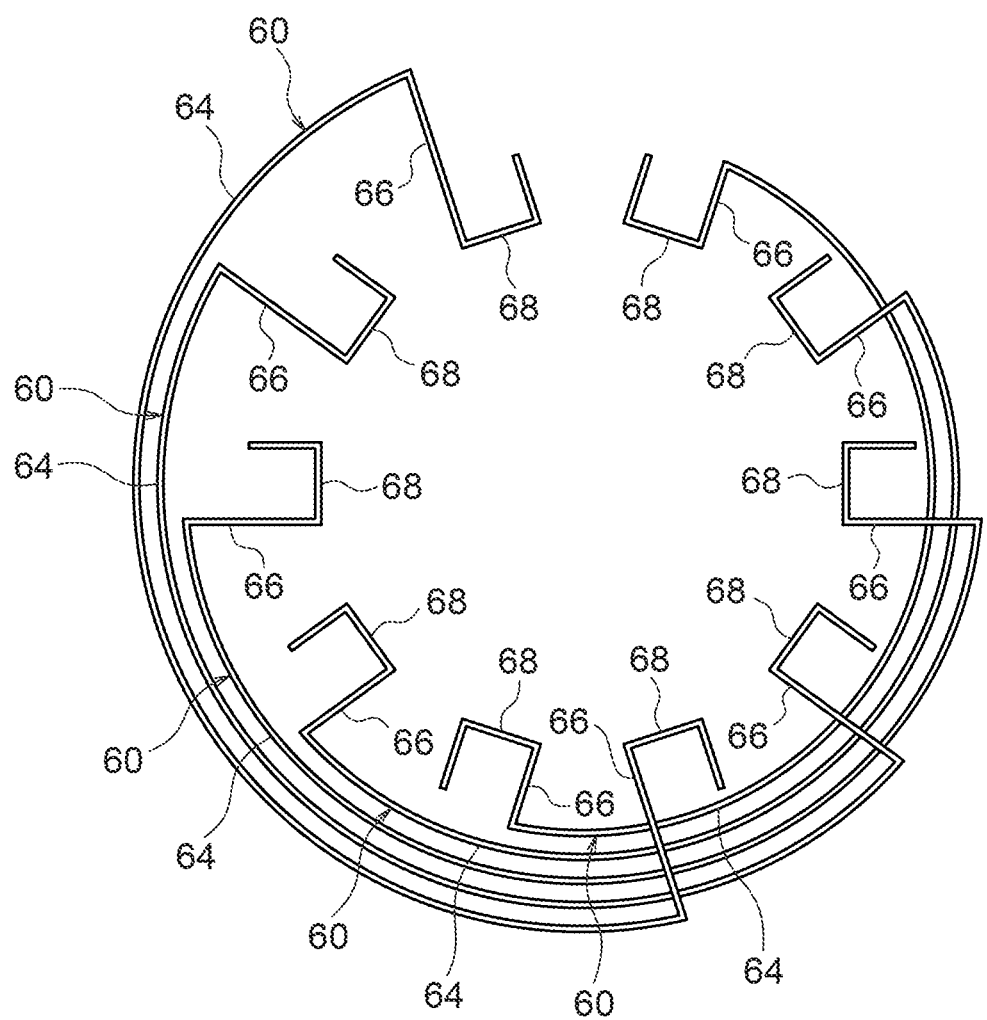
FIG. 4 is a plan view of plural short-circuit lines provided to an armature according to the first exemplary embodiment.

As illustrated in FIG. 4, each of the short-circuit lines 60 includes a circumferential direction wiring portion 64 formed in a circular arc shape, radial direction wiring portions 66 extending from each end of the circumferential direction wiring portion 64 toward the radial direction inside of the circumferential direction wiring portion 64, and rectangular shaped hook portions 68 formed at leading end portions of the radial direction wiring portions 66.

Plural of the circumferential direction wiring portions 64 are disposed in a concentric circular pattern. The respective pairs of hook portions 68 provided to each of the short-circuit lines 60 are disposed facing each other along the radial direction of the respective circumferential direction wiring portion 64, and the plural hook portions 68 are disposed at uniform separations around the circumferential direction of the circumferential direction wiring portions 64. The same number of the plural anchor hooks 42 (see FIG. 3) are provided as the number of the plural hook portions 68. Each of the short-circuit lines 60 is fixed in advance in a shape such that the hook portions 68 hook onto the anchor hooks 42 during assembly to the core 30 illustrated in FIG. 3 (is retained in the shape illustrated in FIG. 4). Namely, the wire length and material of the respective short-circuit lines 60 are selected so as to give enough strength and rigidity to fix the shape in advance.

As illustrated in FIG. 2, the plural short-circuit lines 60 are assembled to the core 30 from the commutator 28 side. In the first exemplary embodiment, the core 30 and the commutator 28 are attached to the shaft 26 as described later, and the windings 32 are wound onto the core 30 (including hooking the connection portions 52 onto the anchor hooks 42) in this state. The plural short-circuit lines 60 are then assembled to the core 30. The plural short-circuit lines 60 are disposed on the commutator 28 side of the core 30 in the assembled state to the core 30.

Moreover, the overall plural short-circuit lines 60 (including the hook portions 68) are disposed further to the radial direction outside (arrow A direction side) of the commutator 28 than the plural commutator segments 40 formed at the outer peripheral portion of the commutator 28. The circumferential direction wiring portions 64 of each of the short-circuit lines 60 are disposed further to the radial direction outside (arrow A side) of the commutator 28 than the anchor hooks 42 provided to the commutator segments 40. The plural circumferential direction wiring portions 64 is superimposed on the winding portions 48 along the axial direction of the core 30.

The plural circumferential direction wiring portions 64 are disposed side-by-side in the radial direction of the core 30, and are provided around the circumferential direction of the commutator 28 (see also FIG. 3). The entire thickness direction of the plural circumferential direction wiring portions 64 overlaps in the axial direction of the commutator 28 with leading end side portions 42A of the anchor hooks 42. The plural circumferential direction wiring portions 64 are accordingly contained within a length direction range (length L range) of the anchor hooks 42.

The respective hook portions 68 are hooked onto the anchor hooks 42 in an assembled state of the plural short-circuit lines 60 to the core 30. Prior to performing fusing to connect the windings 32 to the anchor hooks 42, the plural short-circuit lines 60 are, for example, assembled to the core 30, and the respective hook portions 68 and the connection portions 52 of the windings 32 are connected by fusing to the same respective commutator segments 40 at the same time as each other. Out of the plural commutator segments 40, the respective short-circuit lines 60 connect together pairs of commutator segments 40 facing each other along the commutator 28 radial direction (commutator segments 40 that should be at the same potential as each other) (see FIG. 3).

As described above, in the first exemplary embodiment the plural short-circuit lines 60 are assembled to the core 30 after winding the windings 32 onto the core 30 (including hooking the connection portions 52 onto the anchor hooks 42) in an attached state of the core 30 and the commutator 28 to the shaft 26. The hook portions 68, serving as connection portions between the short-circuit lines 60 and the anchor hooks 42, are positioned further toward the leading end side of the anchor hooks 42 than the connection portions 52 of the windings 32 to the anchor hooks 42.

Explanation follows regarding a manufacturing method of the armature 10 described above.

First, the core 30 and the commutator 28 illustrated in FIG. 2 are attached to the shaft 26. When this is performed, for example the base end portions of the anchor hooks 42 of the commutator 28 contact the core 30 (more specifically, to contact the insulator 56 provided on the surface of the core 30).

In the attached state of the core 30 and the commutator 28 to the shaft 26, the windings 32 are wound onto the core 30, and the winding portions 48 are formed around the teeth 46. When this is performed, the connection portions 52 of the windings 32 to the anchor hooks 42 are hooked onto the anchor hooks 42. Then, the plural short-circuit lines 60 are assembled to the core 30, and the hook portions 68 of each of the short-circuit lines 60 are hooked onto the anchor hooks 42 above the connection portions 52 of the windings 32. When this is performed, the plural short-circuit lines 60 are assembled to the core 30 prior to performing fusing to connect the connection portions 52 of the windings 32 to the anchor hooks 42. The plural short-circuit lines 60 are attached to the core 30 from the commutator 28 side.

Note that the shape of each of the short-circuit lines 60 is fixed in advance as described above. The hook portions 68 accordingly hook onto the anchor hooks 42 accompanying assembly of the respective short-circuit lines 60 to the core 30. Since the plural short-circuit lines 60 are assembled to the core 30 after winding the windings 32 onto the core 30 in the attached state of the core 30 and the commutator 28 to the shaft 26, the hook portions 68, serving as connection portions of the short-circuit lines 60 to the anchor hooks 42, are positioned further toward the leading end side of the anchor hooks 42 than the connection portions 52 of the windings 32 to the anchor hooks 42.

The connection portions 52 of the windings 32 and the hook portions 68 of the short-circuit lines 60 are connected to the same respective commutator segments 40 at the same time by fusing. The armature 10 is accordingly manufactured in the above manner.

Explanation follows regarding operation and advantageous effects of the first exemplary embodiment of the present disclosure.

As described in detail above, in the armature 10 of the first exemplary embodiment, the plural short-circuit lines 60 are employed to connect together pairs of the commutator segments 40 facing each other along the commutator 28 radial direction. Each of the short-circuit lines 60 (including the hook portions 68) is entirely disposed further to the commutator 28 radial direction outside (arrow A side) than the plural commutator segments 40 forming the outer peripheral portion of the commutator 28. The commutator 28 can accordingly be disposed closer to the core 30 than when, for example, the plural short-circuit lines 60 are disposed in the axial direction between the commutator 28 and the core 30.

In particular, the plural short-circuit lines 60 include the circumferential direction wiring portions 64 provided around the circumferential direction of the commutator 28. The respective circumferential direction wiring portions 64 are disposed further to the commutator 28 radial direction outside (arrow A side) than the anchor hooks 42 provided to the commutator segments 40. The circumferential direction wiring portions 64 can accordingly be suppressed from being superimposed on the anchor hooks 42 in the axial direction of the commutator 28, enabling the commutator 28 to be disposed closer to the core 30. A reduction in size in the axial direction of the armature 10 is enabled for the above reasons.

Moreover, the commutator 28 contacts the core 30 due to being disposed closer to the core 30. An axial direction gap between the commutator 28 and the core 30 can accordingly be eliminated, enabling a reduction in size in the axial direction of the armature 10.

This reduction in size in the axial direction of the armature 10 (disposing the commutator 28 closer to the core 30) enables the length of the shaft 26 and the length of the wire material employed for the windings 32 to be made shorter. A reduction in expenditure on materials is accordingly enabled, enabling a reduction in costs.

The windings 32 are wound onto the core 30 in the attached state of the core 30 and the commutator 28 to the shaft 26, after which the plural short-circuit lines 60 are assembled to the core 30. The short-circuit lines 60 can accordingly be suppressed from getting in the way during winding of the windings 32 onto the core 30. Good operability can accordingly be secured during winding of the windings 32.

The short-circuit lines 60 are disposed on the commutator 28 side of the core 30, and the short-circuit lines 60 are moreover assembled to the core 30 from the commutator 28 side in a state in which the core 30 and the commutator 28 are attached to the shaft 26. The side of the core 30 on which the short-circuit lines 60 are disposed is therefore the same as the side from which the short-circuit lines 60 are assembled to the core 30, thus facilitating the assembly operation of the short-circuit lines 60 to the core 30.

The shapes of the short-circuit lines 60 are fixed in advance such that the hook portions 68 hook onto the anchor hooks 42 accompanying assembly to the core 30. Since the hook portions 68 can be hooked onto the anchor hooks 42 accompanying assembly of the short-circuit lines 60 to the core 30, operability can be improved during assembly of the short-circuit lines 60.

The short-circuit lines 60 are assembled to the core 30 prior to connecting the windings 32 to the anchor hooks 42 by fusing. The fusing to connect the windings 32 to the anchor hooks 42 can accordingly be performed at the same time as fusing to connect the short-circuit lines 60 to the anchor hooks 42. Fusing operation efficiency can accordingly be improved.

Both the windings 32 and the short-circuit lines 60 are connected to the same respective commutator segments 40 by fusing at the same time. The number of fusing operations can accordingly be reduced, enabling a reduction in costs, in comparison to when the windings 32 and the short-circuit lines 60 are separately connected to the same commutator segments 40 by fusing.

The circumferential direction wiring portions 64 of the short-circuit lines 60 are superimposed on the winding portions 48 in the axial direction of the core 30. Disposal of the circumferential direction wiring portions 64 in the winding space of the winding portions 48 (winding space in the radial direction of the core 30) can accordingly be suppressed, thereby enabling the desired space factor of the winding portions 48 to be secured.

The entire thickness direction of the circumferential direction wiring portions 64 overlaps in the axial direction of the commutator 28 with the leading end side portions 42A of the anchor hooks 42, and so the circumferential direction wiring portions 64 are contained within the length direction range (within the length L) of the anchor hooks 42. The circumferential direction wiring portions 64 can accordingly be suppressed from sticking out further to the opposite side to that of the core 30 than the leading end portions of the anchor hooks 42, thereby enabling the sliding surface area between the commutator 28 and the brush 24 (see FIG. 1) to be secured while achieving a reduction in size in the axial direction of the commutator 28.

The plural circumferential direction wiring portions 64 are disposed side-by-side in the radial direction of the core 30. This also enables sticking out of the plural circumferential direction wiring portions 64 toward the opposite side to that of the core 30 to be suppressed. The plural circumferential direction wiring portions 64 can accordingly be suppressed from impinging on the brush 24 (see FIG. 1).

The motor M according to the first exemplary embodiment illustrated in FIG. 1 is provided with the armature 10 described above, enabling both a reduction in size in the axial direction and a reduction in costs.

Second Exemplary Embodiment

Explanation follows regarding a second exemplary embodiment of the present disclosure.

Figure 5:
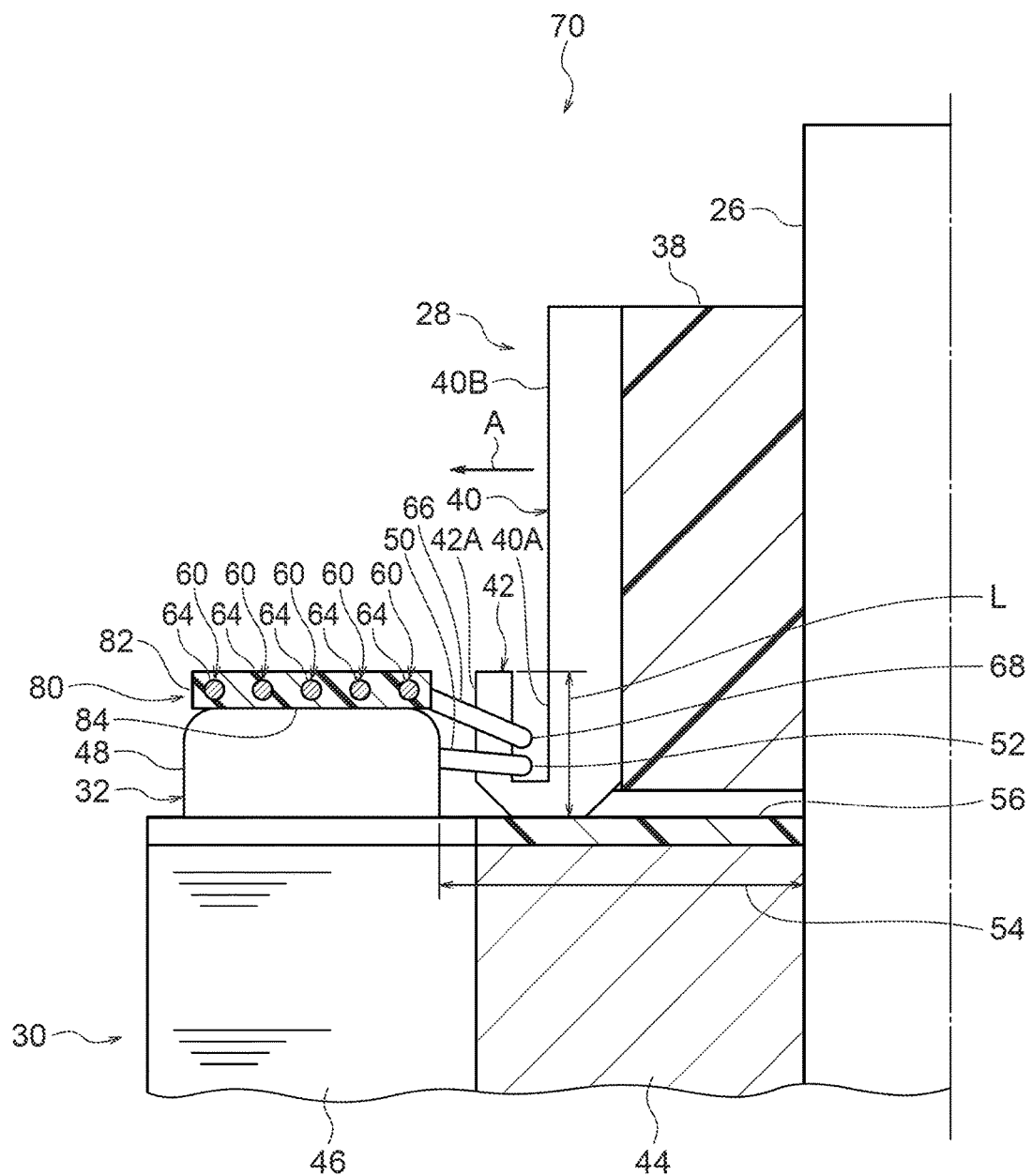
FIG. 5 is an enlarged vertical cross-section of relevant portions of an armature according to a second exemplary embodiment.
Figure 6:
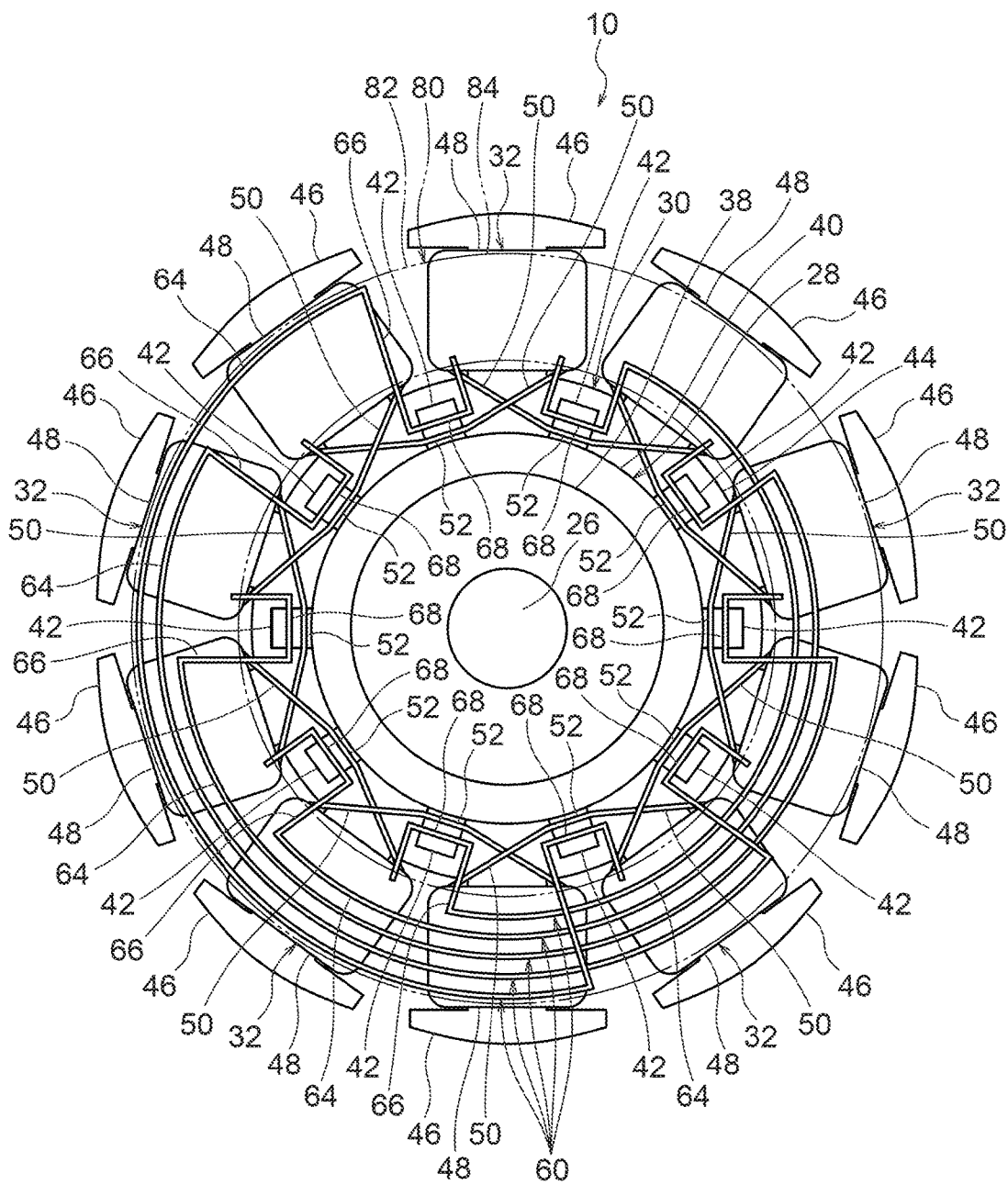
FIG. 6 is a plan view of an armature according to the second exemplary embodiment, viewed along the axial direction.
Figure 7:
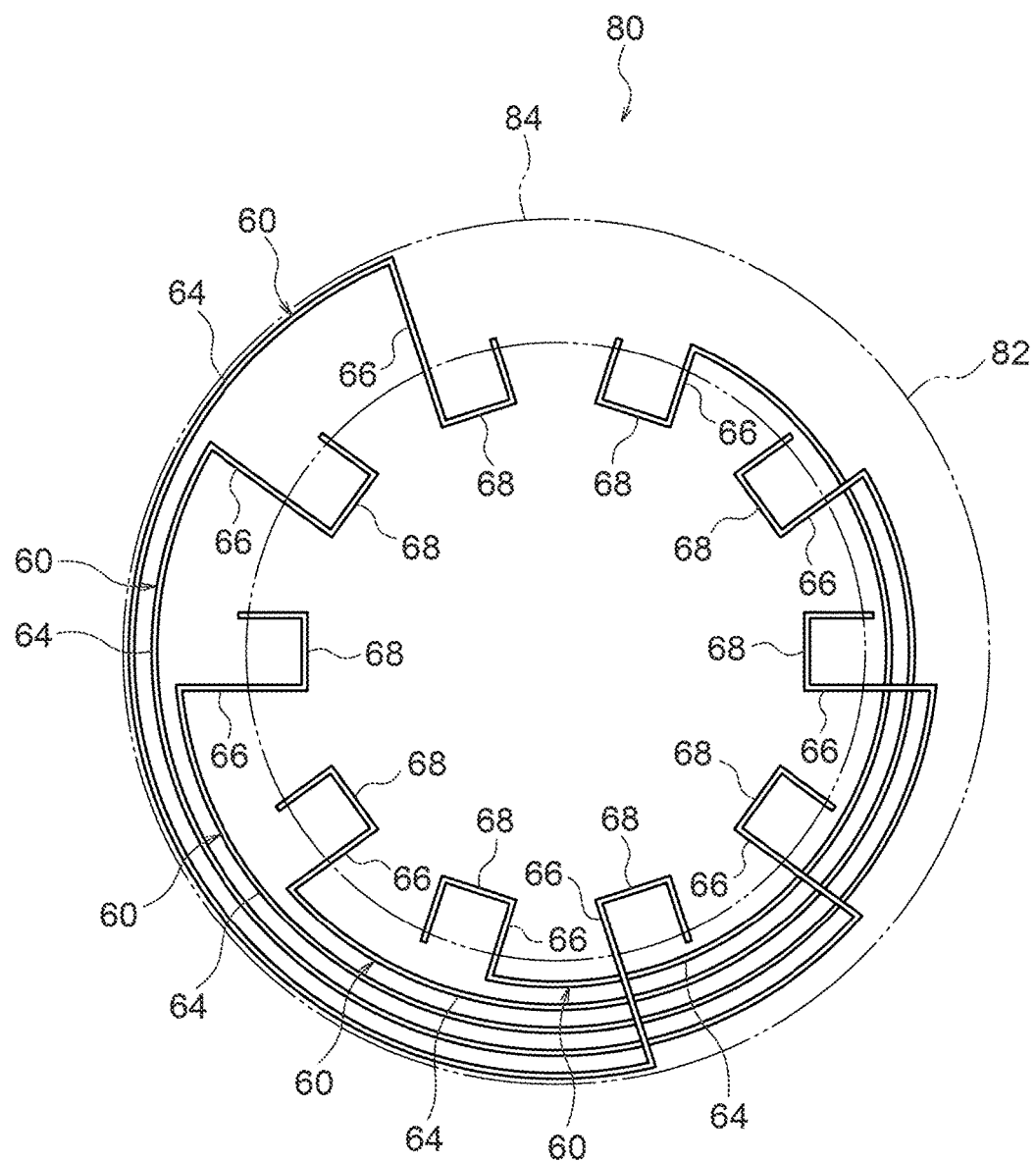
FIG. 7 is a plan view of a short-circuit member provided to an armature according to the second exemplary embodiment.

The configuration of an armature 70 according to the second exemplary embodiment of the present disclosure illustrated in FIG. 5 and FIG. 6 has a configuration modified in the following manner from that of the armature 10 according to the first exemplary embodiment (see FIG. 2 and FIG. 3).

The armature 70 according to the second exemplary embodiment of the present disclosure includes a short-circuit member 80 that connects together the pairs of commutator segments 40 facing each other along the commutator 28 radial direction (the commutator segments 40 that should be at the same potential as each other).

In addition to the plural short-circuit lines 60 of the first exemplary embodiment, the short-circuit member 80 also includes a resin molding 82 that retains the plural short-circuit lines 60. The resin molding 82 is an example of a retaining member, and is integrated together with the plural short-circuit lines 60 by mold forming. More specifically, the resin molding 82 covers the circumferential direction wiring portions 64 of the plural short-circuit lines 60, while the radial direction wiring portions 66 and the hook portions 68 of the short-circuit lines 60 protrude out from the resin molding 82 toward the radial direction inside of the resin molding 82.

The overall short-circuit member 80 including the plural short-circuit lines 60 (including the hook portions 68) and the resin molding 82 is disposed further to the commutator 28 radial direction outside (the arrow A side) than the plural commutator segments 40 formed at the outer peripheral portion of the commutator 28. As illustrated in FIG. 6, the resin molding 82 is provided in a circular ring shape around the circumferential direction of the commutator 28.

The portions of the plural short-circuit lines 60 that are covered by the resin molding 82 (the circumferential direction wiring portions 64) and the resin molding 82 form a circumferential direction wiring portion 84 of the short-circuit member 80. The circumferential direction wiring portion 84 is provided around the circumferential direction of the commutator 28, and is disposed further to the commutator 28 radial direction outside (arrow A side) than the anchor hooks 42. The circumferential direction wiring portion 84 is superimposed on the winding portions 48 in the axial direction of the core 30.

Moreover, the entire thickness direction of the circumferential direction wiring portion 84 overlaps in the axial direction of the commutator 28 with the leading end side portions 42A of the anchor hooks 42. The circumferential direction wiring portion 84 is accordingly contained within the length direction range (within the length L) of the anchor hooks 42.

Due to integrating the plural short-circuit lines 60 together with the resin molding 82, the shape of the short-circuit member 80 is fixed in advance such that the hook portions 68 hook onto the anchor hooks 42 accompanying assembly to the core 30. Namely, in the short-circuit member 80, the wire length and materials of the short-circuit lines 60, and the shape and dimensions of the resin molding 82, are selected so as to give enough strength and rigidity to fix the shape in advance.

Similarly to the plural short-circuit lines 60 of the first exemplary embodiment, the short-circuit member 80 is assembled to the core 30 from the commutator 28 side after winding the windings 32 onto the core 30 in an assembled state of the core 30 and the commutator 28 to the shaft 26, and prior to fusing to connect the windings 32 to the anchor hooks 42.

Note that in the second exemplary embodiment of the present disclosure, configuration other than that described above is similar to that of the first exemplary embodiment. In the second exemplary embodiment of the present disclosure, configuration corresponding to that of the first exemplary embodiment is allocated the same reference numerals, and explanation thereof is omitted.

Next, explanation follows regarding operation and advantageous effects of the second exemplary embodiment of the present disclosure.

As described in detail above, in the armature 70 according to the second exemplary embodiment, the short-circuit member 80 is employed to connect together the pairs of commutator segments 40 facing each other along the commutator 28 radial direction, and the entire short-circuit member 80 (including the hook portions 68) is disposed further to the commutator 28 radial direction outside (arrow A side) than the plural commutator segments 40 forming the outer peripheral portion of the commutator 28. The commutator 28 can accordingly be disposed closer to the core 30 than when, for example, the short-circuit member 80 is disposed between the commutator 28 and the core 30 in the axial direction.

In particular, the short-circuit member 80 includes the circumferential direction wiring portion 84 provided around the circumferential direction of the commutator 28. The circumferential direction wiring portion 84 is disposed further to the commutator 28 radial direction outside (arrow A side) than the anchor hooks 42 provided to the commutator segments 40. The circumferential direction wiring portion 84 can accordingly be suppressed from being superimposed on the anchor hooks 42 in the axial direction of the commutator 28, enabling the commutator 28 to be disposed closer to the core 30. A reduction in size in the axial direction of the armature 10 is enabled for the above reasons.

Moreover, the commutator 28 contacts the core 30 due to being disposed closer to the core 30. An axial direction gap between the commutator 28 and the core 30 can accordingly be eliminated, enabling a reduction in size in the axial direction of the armature 10.

This reduction in size in the axial direction of the armature 10 (disposing the commutator 28 closer to the core 30) enables the length of the shaft 26 and the length of the wire material employed for the windings 32 to be made shorter. A reduction in expenditure on materials is accordingly enabled, enabling a reduction in costs.

The windings 32 are wound onto the core 30 in the attached state of the core 30 and the commutator 28 to the shaft 26, after which the short-circuit member 80 is assembled to the core 30. The short-circuit member 80 can accordingly be suppressed from getting in the way during winding of the windings 32 to the core 30. Good operability can accordingly be secured during winding of the windings 32.

The short-circuit member 80 is disposed on the commutator 28 side of the core 30, and the short-circuit member 80 is moreover assembled to the core 30 from the commutator 28 side in the attached state of the core 30 and the commutator 28 to the shaft 26. The side of the core 30 on which the short-circuit member 80 is therefore the same as the side from which the short-circuit member 80 is assembled to the core 30, thus facilitating the assembly operation of the short-circuit member 80 to the core 30.

The shape of the short-circuit member 80 is fixed in advance such that the hook portions 68 hook onto the anchor hooks 42 accompanying assembly to the core 30. Since the hook portions 68 can be hooked onto the anchor hooks 42 accompanying assembly of the short-circuit member 80 to the core 30, operability can be improved during assembly of the short-circuit member 80.

In particular, the resin molding 82 provided to the short-circuit member 80 integrates together the plural short-circuit lines 60, thereby enabling the plural short-circuit lines 60 to be suppressed from moving apart, and enabling the plural short-circuit lines 60 to be assembled to the core 30 in a single operation. An increase in assembly steps can accordingly be suppressed.

The short-circuit member 80 is attached to the core 30 prior to connecting the windings 32 to the anchor hooks 42 by fusing. The fusing to connect the windings 32 to the anchor hooks 42 can accordingly be performed at the same time as fusing to connect the short-circuit member 80 to the anchor hooks 42. Fusing operation efficiency can accordingly be improved.

Both the windings 32 and the short-circuit member 80 are connected to the same commutator segments 40 by fusing at the same time. The number of fusing operations can accordingly be reduced, enabling a reduction in costs, in comparison to when the windings 32 and the short-circuit member 80 are separately connected to the same commutator segments 40 by fusing.

The circumferential direction wiring portion 84 of the short-circuit member 80 is superimposed on the winding portions 48 in the axial direction of the core 30. Disposal of the circumferential direction wiring portion 84 in the winding space of the winding portions 48 (winding space in the radial direction of the core 30) can accordingly be suppressed, thereby enabling the desired space factor of the winding portions 48 to be secured.

The entire thickness direction of the circumferential direction wiring portion 84 overlaps in the axial direction of the commutator 28 with the leading end side portions 42A of the anchor hooks 42, and so the circumferential direction wiring portion 84 is contained within the length direction range (within the length L) of the anchor hooks 42. The circumferential direction wiring portion 84 can accordingly be suppressed from sticking out further to the opposite side to that of the core 30 than the leading end portions of the anchor hooks 42, thereby enabling the sliding surface area between the commutator 28 and the brush 24 (see FIG. 1) to be secured while achieving a reduction in size in the axial direction of the commutator 28.

In the short-circuit member 80, the plural circumferential direction wiring portions 64 formed to the short-circuit lines 60 are disposed side-by-side in the radial direction of the core 30. This enables the thickness of the circumferential direction wiring portion 84 of the short-circuit member 80, configured from the plural circumferential direction wiring portions 64 and the resin molding 82, to be suppressed. This enables sticking out of the circumferential direction wiring portion 84 of the short-circuit member 80 toward the opposite side to that of the core 30 to be suppressed. The circumferential direction wiring portion 84 can accordingly be suppressed from impinging on the brush 24 (see FIG. 1).

Next, explanation follows regarding modified examples with commonality to both the first exemplary embodiment and the second exemplary embodiment.

First Modified Example

Figure 8:
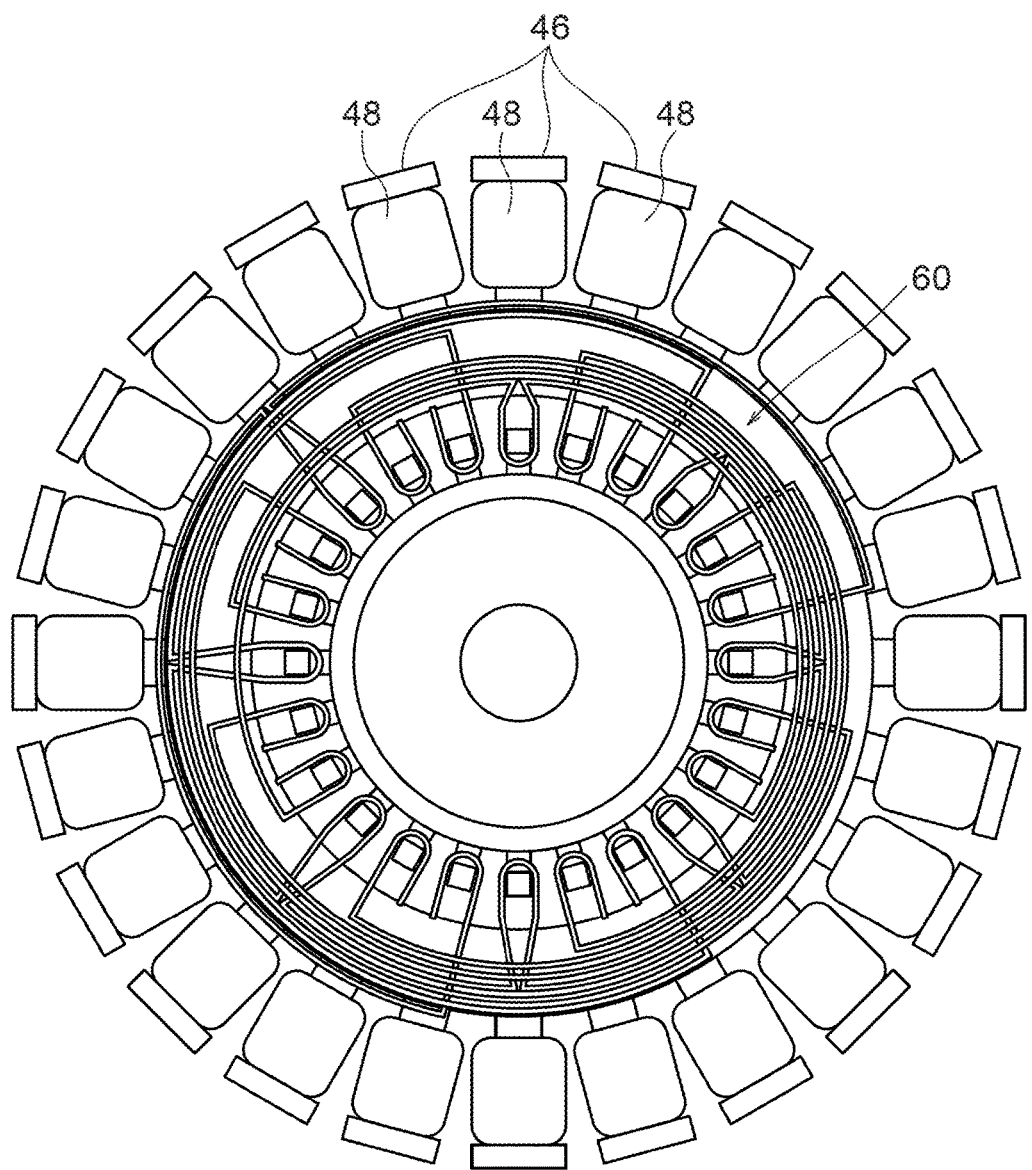
FIG. 8 is a plan view of an armature according to a first modified example, viewed along the axial direction.

The first exemplary embodiment and the second exemplary embodiment may be configured with twenty four of the plural teeth 46, as illustrated in FIG. 8. Although not specifically illustrated in the drawings, other numbers of the plural teeth 46 are also possible. The number of poles of the magnets 22 illustrated in FIG. 1 may also differ from that described above.

Second Modified Example

Figure 9:
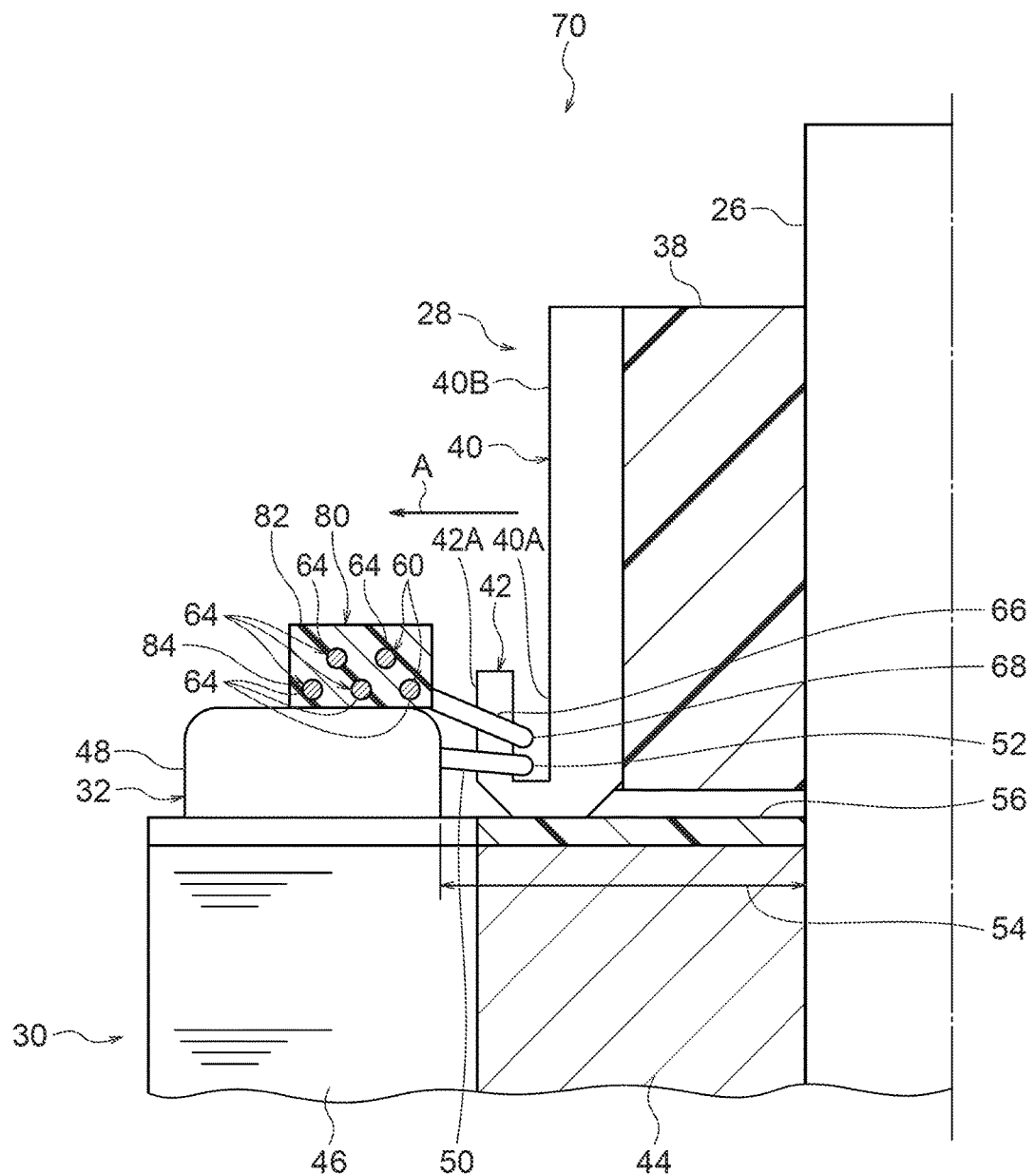
FIG. 9 is an enlarged vertical cross-section of relevant portions of an armature according to a second modified example.

In the second exemplary embodiment, the plural circumferential direction wiring portions 64 formed to the short-circuit lines 60 are disposed side-by-side in the radial direction of the core 30; however, as illustrated in FIG. 9, the plural circumferential direction wiring portions 64 may be disposed side-by-side in both the radial direction and axial direction of the core 30. In such cases, only a portion in the thickness direction (a core 30 side portion) of the circumferential direction wiring portion 84 of the short-circuit member 80, configured by the plural circumferential direction wiring portions 64 and the resin molding 82, may overlap in the axial direction of the commutator 28 with the leading end side portions 42A of the anchor hooks 42.

Such a configuration still enables protrusion of the circumferential direction wiring portion 84 toward the opposite side to that of the core 30 with respect to the leading end portions of the anchor hooks 42 to be suppressed, enabling the sliding surface area between the commutator 28 and the brush 24 (see FIG. 1) to be secured while achieving a reduction in size in the axial direction of the commutator 28.

Note that although not specifically illustrated in the drawings, in the first exemplary embodiment the plural circumferential direction wiring portions 64 may be disposed side-by-side in both the radial direction and the axial direction of the core 30. In such cases, only a portion of the plural circumferential direction wiring portions 64 in the thickness direction may overlap in the axial direction of the commutator 28 with the leading end side portions 42A of the anchor hooks 42.

Third Modified Example

Figure 10:
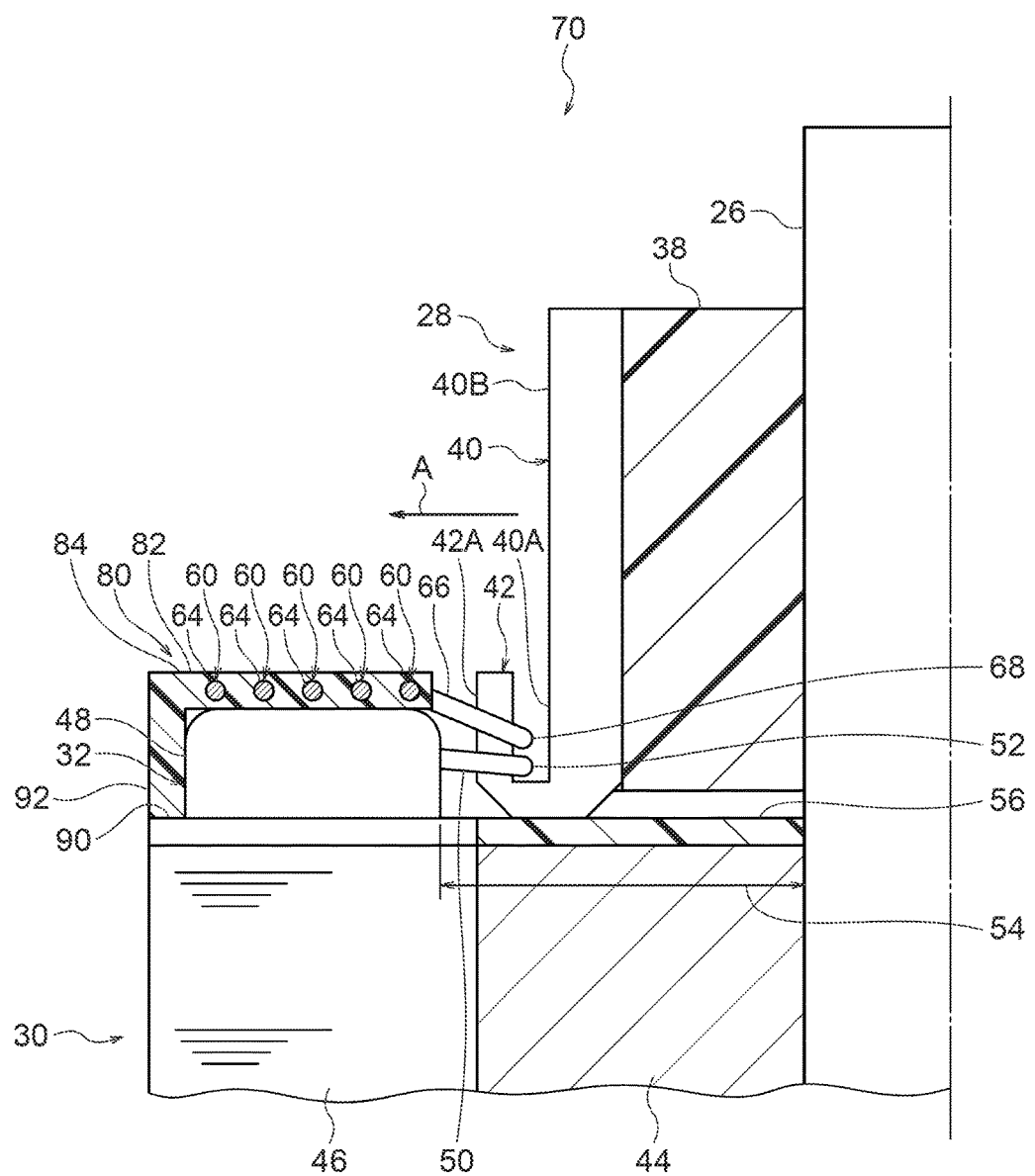
FIG. 10 is an enlarged vertical cross-section of relevant portions of an armature according to a third modified example.

In the second exemplary embodiment, as illustrated in FIG. 10, for example, a positioning portion 90 configured by a flat face may be provided at a portion of the core 30 (insulator 56) at the radial direction outside of the winding portions 48, and the short-circuit member 80 may be provided with a positioned portion 92 extending from an outer peripheral portion of the resin molding 82 toward the positioning portion 90. The short-circuit member 80 may be positioned with respect to the core 30 in the axial direction and radial direction of the core 30 by contacting the positioned portion 92 against the positioning portion 90.

Such a configuration enables the short-circuit member 80 to be positioned with respect to the core 30, thereby enabling good assembly characteristics of the short-circuit member 80 to the core 30. Since the short-circuit member 80 can also be positioned with respect to the commutator 28, the hook portions 68 can be easily hooked onto the anchor hooks 42 during assembly of the short-circuit member 80.

Note that the positioning portion 90 and the positioned portion 92 described above may be formed anywhere on the core 30 and the short-circuit member 80.

Although not specifically illustrated in the drawings, the short-circuit lines 60 of the first exemplary embodiment may also be provided with positioned portions that contact positioning portions 90 to position the short-circuit lines 60.

Fourth Modified Example

Figure 11:
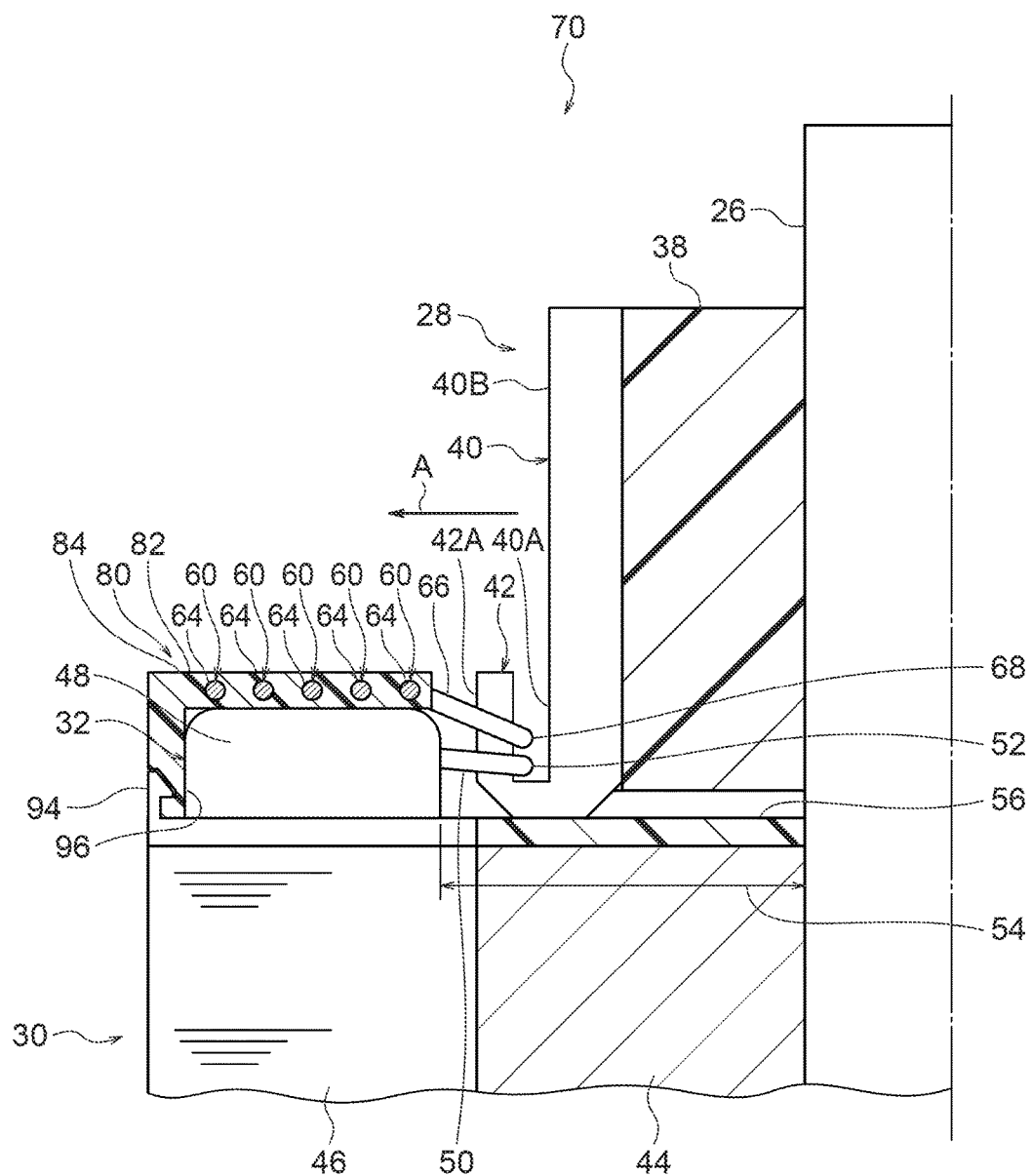
FIG. 11 is an enlarged vertical cross-section of relevant portions of an armature according to a fourth modified example.

As illustrated in FIG. 11, in the second exemplary embodiment a claw shaped fitting portion 94 may be provided to a portion of the core 30 (insulator 56) at the radial direction outside of the winding portions 48, and a claw shaped fitted portion 96 may be provided to the short-circuit member 80 extending from an outer peripheral portion of the resin molding 82 toward the fitting portion 94. The short-circuit member 80 may be fixed to the core 30 by fitting the fitted portion 96 together with the fitting portion 94.

Such a configuration enables the short-circuit member 80 to be fixed to the core 30, thereby the short-circuit member 80 to be suppressed from rattling against the core 30.

Note that the fitting portion 94 and the fitted portion 96 may be formed anywhere on the core 30 and the short-circuit member 80.

Although not specifically illustrated in the drawings, the short-circuit lines 60 of the first exemplary embodiment may also be provided with claw shaped fitted portions that fit together with fitting portions 94 to fix the short-circuit lines 60 to the core 30.

Fifth Modified Example

Figure 12:
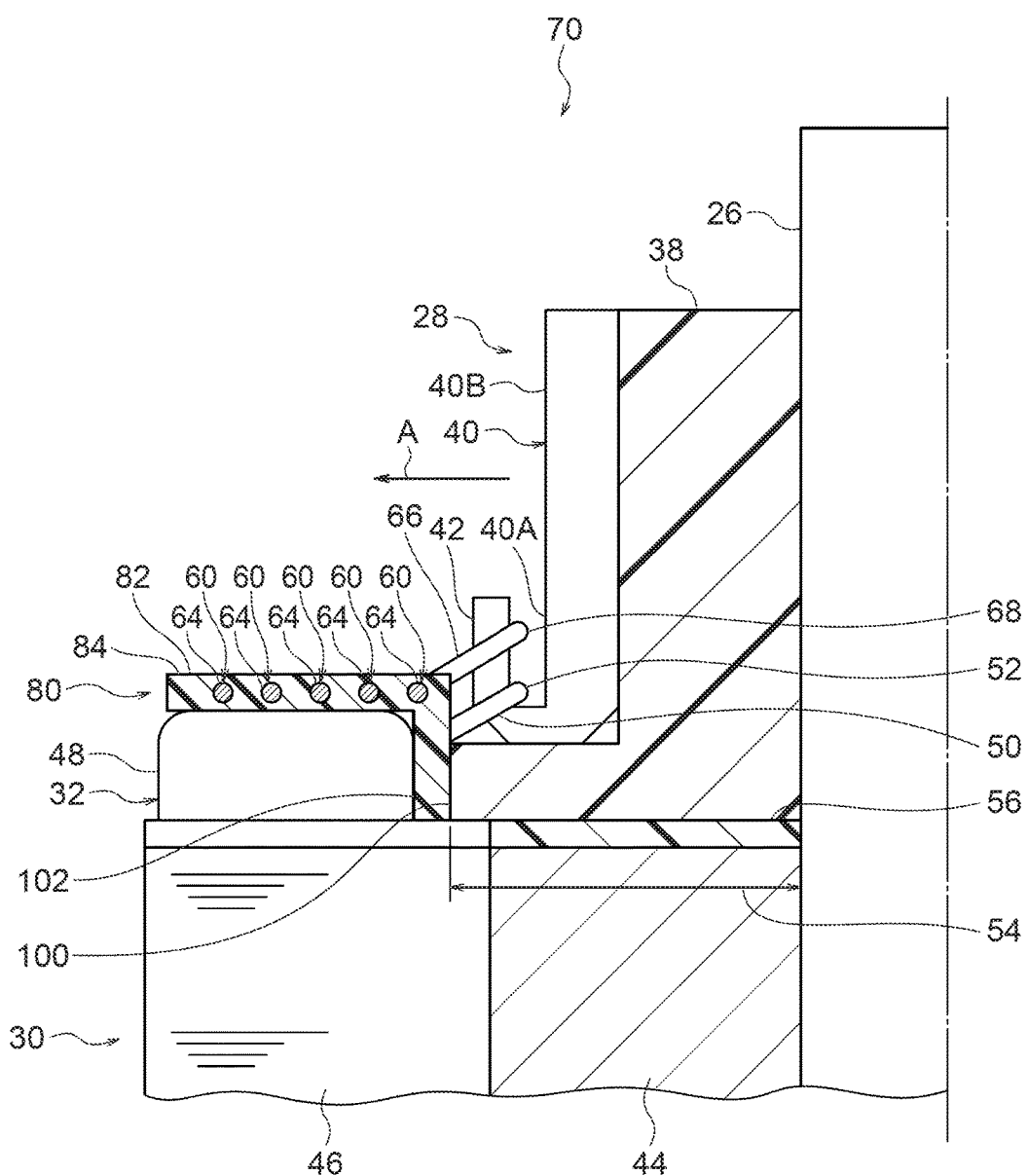
FIG. 12 is an enlarged vertical cross-section of relevant portions of an armature according to a fifth modified example.

As illustrated in FIG. 12, in the second exemplary embodiment, for example a positioning portion 100 may be provided at a core 30 side end portion of the commutator 28 (body 38) extending toward the radial direction outside of the commutator 28, and the short-circuit member 80 may be provided with a positioned portion 102 extending from an inner peripheral portion of the resin molding 82 toward the core 30 side. The short-circuit member 80 may be positioned in the commutator 28 radial direction with respect to the commutator 28 by the positioned portion 102 contacting the positioning portion 100.

Such a configuration enables the short-circuit member 80 to be positioned with respect to the commutator 28, thereby enabling the hook portions 68 to be easily hooked onto the anchor hooks 42 during assembly of the short-circuit member 80. The short-circuit member 80 can be positioned with respect to the core 30, thereby enabling good assembly characteristics of the short-circuit member 80 to the core 30.

The positioning portion 100 and the positioned portion 102 may be formed anywhere on the core 30 and the short-circuit member 80.

The fifth modified example may be combined with the third modified example described above to form positioning portions to both the core 30 and the commutator 28, and form positioned portions corresponding to these positioning portions on the short-circuit member 80.

Although not specifically illustrated in the drawings, the short-circuit lines 60 of the first exemplary embodiment may also be provided with positioned portions that contact positioning portions 100 to position the short-circuit lines 60.

Sixth Modified Example

Figure 13:
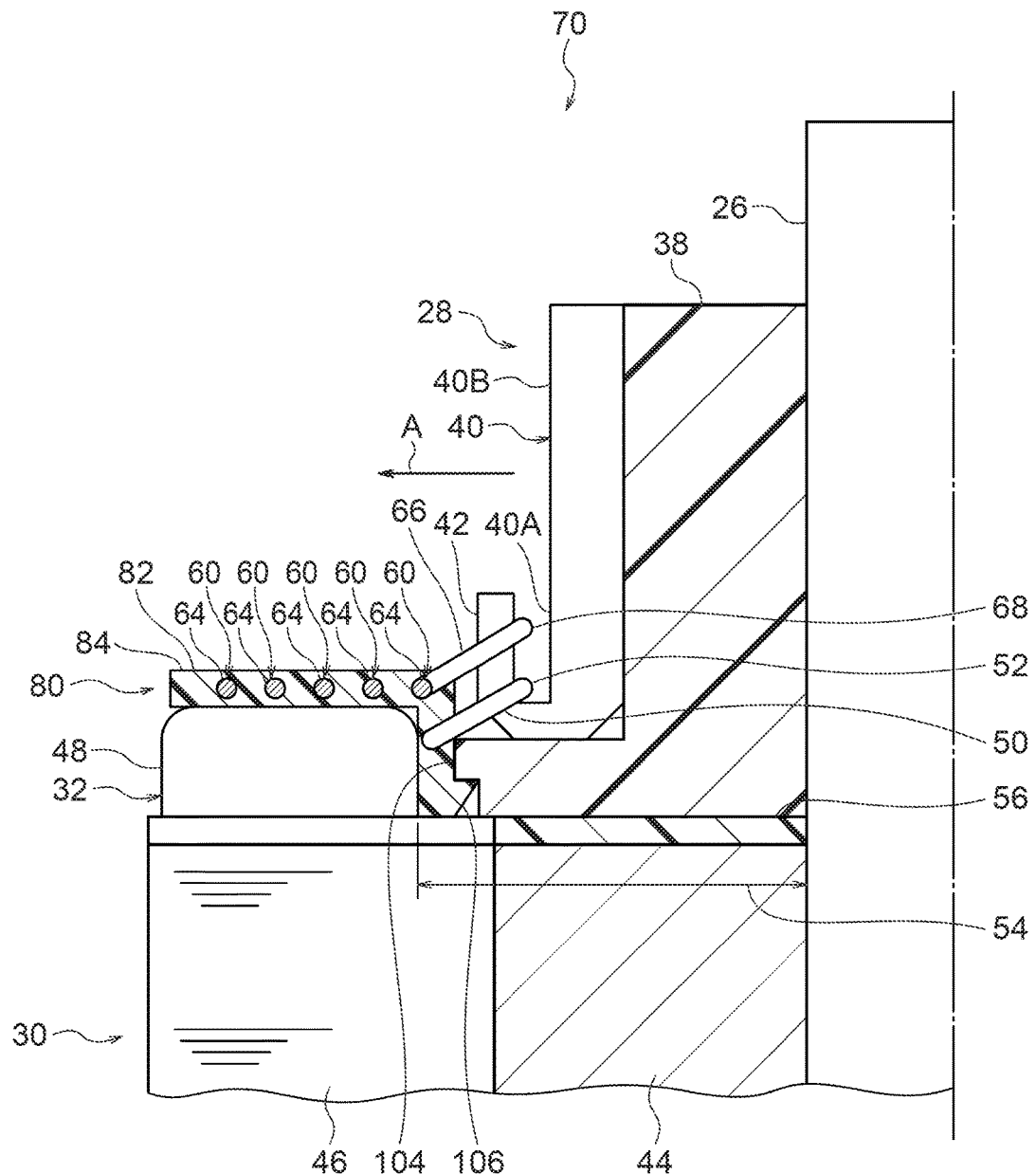
FIG. 13 is an enlarged vertical cross-section of relevant portions of an armature according to a sixth modified example.

As illustrated in FIG. 13, in the second exemplary embodiment, for example a fitting portion 104 may be provided extending to the radial direction outside of the commutator 28 at a core 30 side end portion of the commutator 28 (body 38), and the short-circuit member 80 may be provided with a fitted portion 106 extending from an inner peripheral portion of the resin molding 82 toward the core 30 side. The fitted portion 106 and the fitting portion 104 may be fitted together to fix the short-circuit member 80 to the commutator 28.

Such a configuration enables the short-circuit member 80 to be fixed to the commutator 28, thereby enabling the short-circuit member 80 to be suppressed from rattling against the commutator 28.

Note that the fitting portion 104 and the fitted portion 106 may be formed anywhere on the commutator 28 and the short-circuit member 80.

The sixth modified example may be combined with the fourth modified example to form fitting portions to both the core 30 and the commutator 28, and to form fitted portions to the short-circuit member 80 corresponding to these respective fitting portions.

Although not specifically illustrated in the drawings, the short-circuit lines 60 of the first exemplary embodiment may also be provided with fitted portions that fit together with fitting portions 104 to fix the short-circuit lines 60 to the commutator 28.

Seventh Modified Example

The armature 70 may be manufactured in the following manner in the second exemplary embodiment. In a seventh modified example, as illustrated in the upper drawing of FIG. 14, first the core 30 and the commutator 28 are attached to the shaft 26. When this is performed, the commutator 28 is in a state moved further to the opposite side to that of the core 30 than the windings 32 and the short-circuit member 80.

In this state, the windings 32 are wound onto the core 30, and the winding portions 48 are formed to the teeth 46. The connection portions 52 of the windings 32 to the anchor hooks 42 are hooked onto the anchor hooks 42. The short-circuit member 80 is then assembled to the core 30. When this is performed, the short-circuit member 80 is assembled to the core 30 from the commutator 28 side. The short-circuit member 80 is moreover assembled to the core 30 prior to connecting the windings 32 to the anchor hooks 42 by fusing.

The hook portions 68 of the short-circuit member 80 are hooked onto the anchor hooks 42 from above the connection portions 52 of the windings 32. The shape of the short-circuit member 80 is fixed in advance, and so the hook portions 68 hook onto the anchor hooks 42 accompanying assembly of the short-circuit member 80 to the core 30. The connection portions 52 of the windings 32 and the hook portions 68 of the short-circuit member 80 are moreover both connected to the same commutator segments 40 by fusing at the same time.

Figure 14:
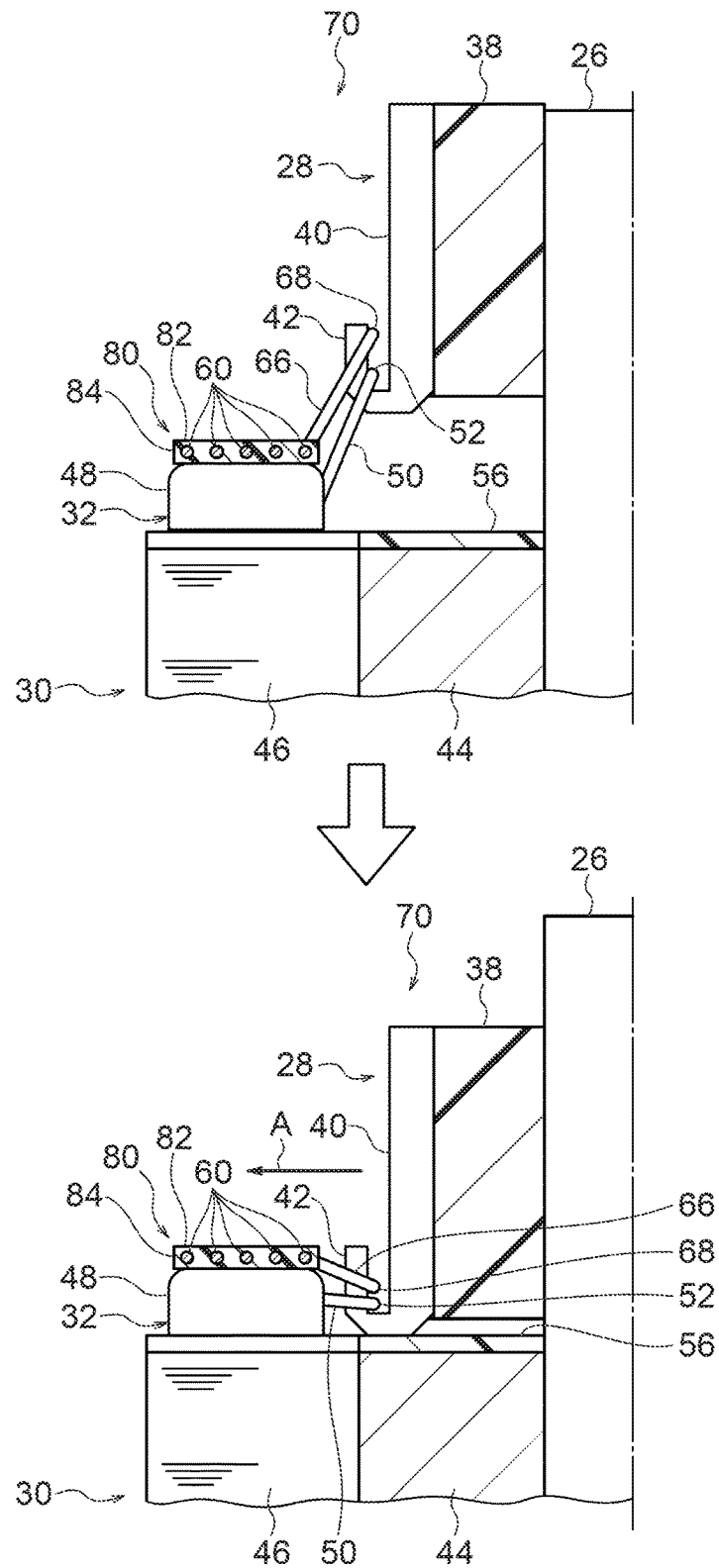
FIG. 14 is a drawing to explain a manufacturing process of an armature according to a seventh modified example.

After connecting the windings 32 and the short-circuit member 80 to the commutator segments 40 in this manner, the commutator 28 is moved toward the core 30 side, as illustrated in the lower drawing of FIG. 14. When this is performed, for example the base end portions of the anchor hooks 42 of the commutator 28 contact the core 30 (more specifically, the insulator 56 provided to the surface of the core 30). The armature 70 is thus manufactured in the above manner.

Accordingly, in the seventh modified example, the connection portions 52 of the windings 32 and the hook portions 68 of the short-circuit member 80 are connected to the anchor hooks 42 in a state in which the commutator 28 has been moved further to the opposite side to that of the core 30 than the windings 32 and the short-circuit member 80. The winding portions 48 and the circumferential direction wiring portion 84 can accordingly be suppressed from getting in the way when connecting the connection portions 52 and the hook portions 68 to the anchor hooks 42 (during fusing). Ease of operation can accordingly be improved when connecting the connection portions 52 and the hook portions 68 to the anchor hooks 42.

Note that although not specifically illustrated in the drawings, in the first exemplary embodiment, the windings 32 and the short-circuit lines 60 may be connected to the commutator segments 40 in a state in which the commutator 28 has been moved further to the opposite side to that of the core 30 than the windings 32 and the short-circuit lines 60. The commutator 28 may also be moved back toward the core 30 side after connecting to the windings 32 and the short-circuit lines 60 to the commutator segments 40.

Eighth Modified Example

Figure 15:
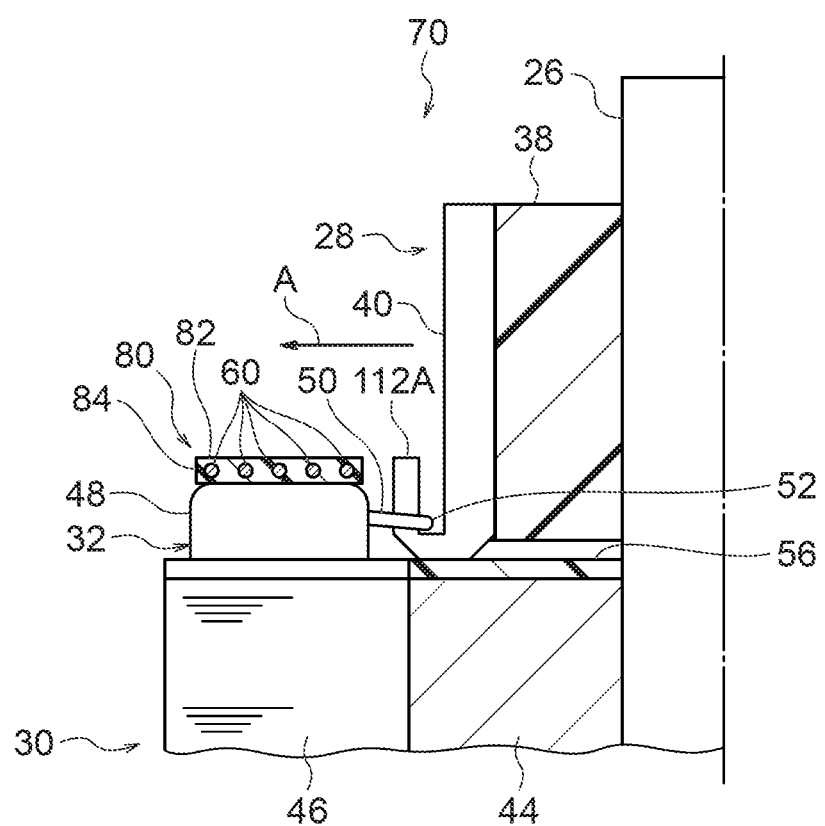
FIG. 15 is an enlarged vertical cross-section of relevant portions of an armature according to an eighth modified example, taken at the position of a first anchor hook.
Figure 16:
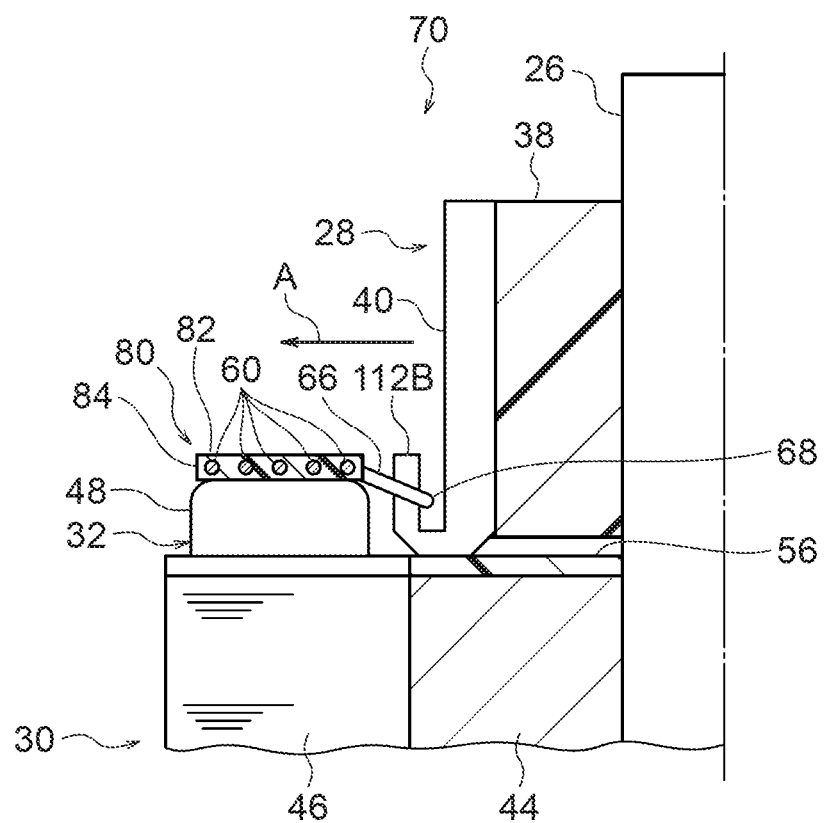
FIG. 16 is an enlarged vertical cross-section of relevant portions of an armature according to the eighth modified example, taken at the position of a second anchor hook.

In the second exemplary embodiment, as illustrated in FIG. 15 and FIG. 16, the respective commutator segments 40 may be bent around to form first anchor hooks 112A and second anchor hooks 112B, and the connection portions 52 of the windings 32 may be connected to the first anchor hooks 112A, and the hook portions 68 of the short-circuit member 80 may be connected to the second anchor hooks 112B.

Such a configuration to connect the connection portions 52 of the windings 32 and the hook portions 68 of the short-circuit member 80 to the separate first anchor hooks 112A and second anchor hooks 112B enables good operability to be achieved during connection of the connection portions 52 and the hook portions 68 to the commutator segments 40 (when hooking onto the anchor hooks).

Note that although not specifically illustrated in the drawings, in the first exemplary embodiment the respective commutator segments 40 may be bent around to form the first anchor hooks 112A and the second anchor hooks 112B, and the connection portions 52 of the windings 32 may be connected to the first anchor hooks 112A, and the hook portions 68 of the short-circuit lines 60 may be connected to the second anchor hooks 112B.

The commutator 28 may be also provided with a combination of anchor hooks to which only the connection portions 52 of the windings 32 are connected, anchor hooks to which only the hook portions 68 of the short-circuit lines 60 are connected, and anchor hooks to which both the connection portions 52 of the winding 32 and the hook portions 68 of the short-circuit lines 60 are connected.

Ninth Modified Example

Figure 17:
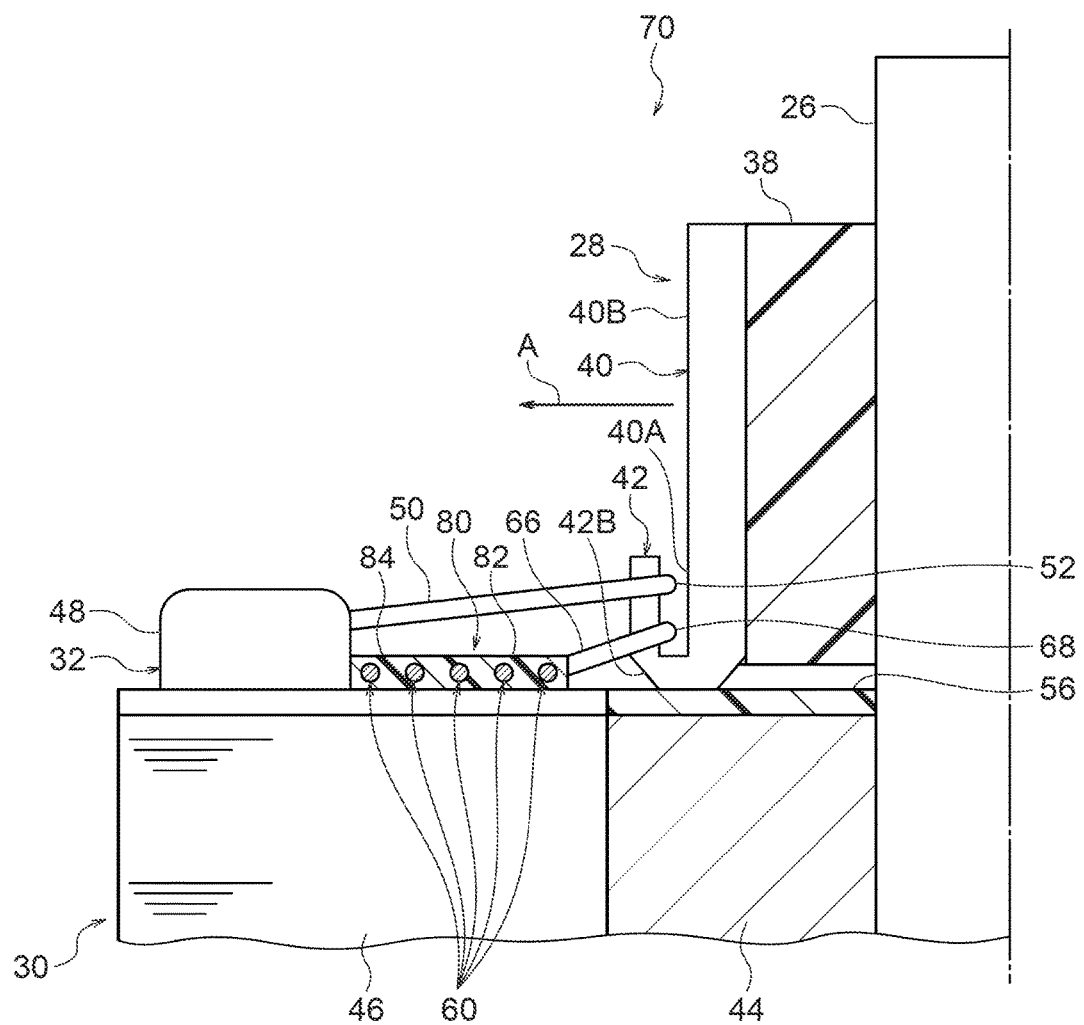
FIG. 17 is an enlarged vertical cross-section of relevant portions of an armature according to a ninth modified example.

The placement of the short-circuit member 80 in the second exemplary embodiment may be modified as illustrated in FIG. 17. Namely in a ninth modified example, the circumferential direction wiring portion 84 of the short-circuit member 80 may be disposed in the radial direction of the core 30 between the commutator 28 and the winding portions 48. The thickness of the circumferential direction wiring portion 84 is set thin enough for the circumferential direction wiring portion 84 to be contained within a range of the projection height of the winding portions 48 with respect to the core 30, and the entire thickness direction of the circumferential direction wiring portion 84 overlaps in the axial direction of the commutator 28 with a base end side portion 42B of the anchor hooks 42.

The short-circuit member 80 is assembled to the core 30 prior to winding the windings 32 onto the core 30 in an attached state of the core 30 and the commutator 28 to the shaft 26, and the hook portions 68 that are the connection portions of the short-circuit member 80 to the anchor hooks 42 are positioned further toward the base end side of the anchor hooks 42 than the connection portions 52 of the windings 32 to the anchor hooks 42. Moreover, the crossing wires 50 provided between the connection portions 52 of the windings 32 to the anchor hooks 42 and the winding portions 48 are disposed separated, further to the opposite side to that of the core 30 than the short-circuit member 80.

In the ninth modified example, the short-circuit member 80 is assembled to the core 30 prior to winding the windings 32 onto the core 30 in the attached state of the core 30 and the commutator 28 to the shaft 26. The windings 32 can accordingly be suppressed from getting in the way during assembly of the short-circuit member 80 to the core 30. Good operability can accordingly be secured during assembly of the short-circuit member 80.

The circumferential direction wiring portion 84 of the short-circuit member 80 is disposed in the radial direction of the core 30 between the commutator 28 and the winding portions 48. Remaining space in the radial direction of the core 30 between the commutator 28 and the winding portions 48 can accordingly be utilized effectively for placement of the circumferential direction wiring portion 84, thereby enabling a reduction in size of the armature 10 in both the axial direction and the radial direction.

The circumferential direction wiring portion 84 of the short-circuit member 80 is contained within the range of the projection height of the winding portions 48 with respect to the core 30. The circumferential direction wiring portion 84 of the short-circuit member 80 can accordingly be suppressed from projecting out further in the core 30 axial direction than the winding portions 48, thereby enabling a reduction in size of the axial direction of the commutator 28, and enabling the sliding surface area between the commutator 28 and the brush 24 (see FIG. 1) to be secured.

The crossing wires 50 provided between the connection portions 52 of the windings 32 to the anchor hooks 42 and the winding portions 48 are disposed separated, further to the opposite side to that of the core 30 than the short-circuit member 80. The short-circuit member 80 can accordingly be suppressed from getting in the way when laying out the crossing wires 50, enabling good operability to be secured during layout of the crossing wires 50.

Moreover, although not specifically illustrated in the drawings, the ninth modified example may also be applied to the first exemplary embodiment. Namely, the ninth modified example may be applied to the first exemplary embodiment by omitting the resin molding 82 from the ninth modified example.

Other Modified Examples

In the first and second exemplary embodiments, the windings 32 may include short-circuit lines 60 of any pair of the commutator segments 40 separately to the plural short-circuit lines 60 described above. In such cases, the short-circuit lines 60 included in the windings 32 may be disposed between the commutator 28 and the core 30 in the axial direction.

In the first and second exemplary embodiments, the plural short-circuit lines 60 respectively connect together pairs of the commutator segments 40 facing each other along the commutator 28 radial direction as an example of commutator segments 40 that should be at the same potential as each other. However, the plural short-circuit lines 60 may connect together commutator segments 40 other than pairs of the commutator segments 40 facing each other along the commutator 28 radial direction.

In the first and second exemplary embodiments, the short-circuit lines 60 are wire members employed as an example of short-circuit members that connect together commutator segments 40 that should be at the same potential as each other. However, short-circuit members may also be formed from members other than wire members (for example long, thin plate members such as terminals).

In the first and second exemplary embodiments, the commutator 28 contacts the core 30 at the anchor hooks 42; however instead of the anchor hooks 42, portions of the commutator 28 other than the anchor hooks 42, such as the commutator segments 40 or the body 38, may contact the core 30. The commutator 28 may also be placed close to the core 30 without making contact therewith.

In the first exemplary embodiment, the dimensions and placement of various portions may be modified such that at least a portion of the thickness direction of the circumferential direction wiring portions 64 overlaps in the axial direction of the commutator 28 with at least a portion of the length direction of the anchor hooks 42. Similarly, in the second exemplary embodiment, the dimensions and placement of various portions may be modified such that at least a portion of the thickness direction of the circumferential direction wiring portion 84 overlaps in the axial direction of the commutator 28 with at least a portion of the length direction of the anchor hooks 42.

In the first and second exemplary embodiments, the short-circuit lines 60 and the windings 32 are formed from the same wire material as each other as a preferable example, however the wire materials may be different from each other. The wire materials used for the short-circuit lines 60 and the windings 32 may, for example, be copper and aluminum. The short-circuit lines 60 and the windings 32 may be configured from wire materials of the same length, or may be configured from wire materials of different lengths to each other.

In the first and second exemplary embodiments, the respective hook portions 68 and the connection portions 52 of the windings 32 may be connected to the same commutator segments 40 by fusing in sequence. Performing continuous connection of the windings 32 and the short-circuit lines 60 to the anchor hooks 42 by fusing in this manner enables efficiency of the fusing operation to be improved.

Note that obviously, modified examples obtainable by combining the plural modified examples above may be implemented in appropriate combinations.

Explanation has been given regarding exemplary embodiments of the present disclosure, however there is no limitation thereto, and obviously various modifications may be implemented within a range not departing from the spirit of the present disclosure.

What is claimed is:

1. An armature comprising:
a shaft;
a core attached to the shaft;
a commutator having a body disposed at a periphery of the shaft, a plurality of commutator segments disposed at an outer peripheral portion of the body, and anchor hooks formed at core side end portions of respective commutator segments, the anchor hooks being bent toward end portions of the respective commutator segments that are opposite from the core;
windings that are wound onto the core and are connected to respective anchor hooks; and
a short-circuit member that connects together anchor hooks formed at a pair of commutator segments among the plurality of commutator segments,
wherein the short-circuit member includes a circumferential direction wiring portion provided around a circumferential direction of the commutator, radial direction wiring portions extending from each end of the circumferential direction wiring portion toward a radial direction inside of the circumferential direction wiring portion, and a retaining member integrated together with the circumferential direction wiring portion, and
wherein a part of the circumferential direction wiring portion that is integrated with the retaining member is disposed further toward a radial direction outside of the commutator than the anchor hooks, across the radial direction wiring portion from the anchor hooks.

2. The armature of claim 1, wherein:
the short-circuit member is assembled to the core, after the windings have been wound onto the core in a state in which the core and the commutator are attached to the shaft.

3. The armature of claim 1, wherein:
the short-circuit member is assembled to the core, prior to winding the windings onto the core in a state in which the core and the commutator are attached to the shaft.

4. The armature of claim 1, wherein:
the short-circuit member is disposed on the commutator side of the core, and the short-circuit member is assembled to the core from the commutator side in a state in which the core and the commutator are attached to the shaft.

5. The armature of claim 2, wherein:
the short-circuit member is assembled to the core prior to connecting the windings to the anchor hooks by fusing.

6. The armature of claim 2, wherein:
hook portions that hook onto the respective anchor hooks are formed at the short-circuit member; and
the short-circuit member has a shape fixed in advance such that the hook portions hook onto the anchor hooks in a state in which the short-circuit member is assembled to the core.

7. The armature of claim 1, wherein:
the commutator is in contact with, or in close proximity to, the core.

8. The armature of claim 1, wherein:
the windings each include a winding portion wound around a tooth portion formed at the core; and
the part of the circumferential direction wiring portion that is integrated with the retaining member is superimposed on the winding portion in the axial direction of the core.

9. The armature of claim 1, wherein:
the windings each include a winding portion wound around a tooth portion formed at the core; and
the part of the circumferential direction wiring portion that is integrated with the retaining member is disposed in the radial direction of the core between the commutator and the winding portion.

10. The armature of claim 9, wherein:
the part of the circumferential direction wiring portion that is integrated with the retaining member is contained within a range of a projection height of the winding portion with respect to the core.

11. The armature of claim 9, wherein:
a crossing wire provided between a connection portion of each of the windings with the anchor hook and the winding portion is disposed separated, further to the opposite side from the core than the short-circuit member.

12. A motor comprising the armature of claim 1.

* * * * *